(12) United States Patent
Toyokawa et al.

(10) Patent No.: US 7,540,005 B2
(45) Date of Patent: May 26, 2009

(54) DISK DRIVE

(75) Inventors: Shokichi Toyokawa, Usa (JP); Masato Kudo, Nakatsu (JP)

(73) Assignee: Panasonic Corporation, Osaka (JP)

( * ) Notice: Subject to any disclaimer, the term of this patent is extended or adjusted under 35 U.S.C. 154(b) by 398 days.

(21) Appl. No.: 11/300,286

(22) Filed: Dec. 15, 2005

(65) Prior Publication Data

US 2006/0130089 A1 Jun. 15, 2006

(30) Foreign Application Priority Data

Dec. 15, 2004 (JP) ............................. 2004-362639
May 20, 2005 (JP) ............................. 2005-147882

(51) Int. Cl.
*G11B 19/20* (2006.01)
(52) U.S. Cl. ....................... 720/709; 720/707
(58) Field of Classification Search ......... 720/695–717; 369/264, 269, 270.1
See application file for complete search history.

(56) References Cited

U.S. PATENT DOCUMENTS

| | | | | |
|---|---|---|---|---|
| 5,457,676 | A | * | 10/1995 | Park ............................. 720/710 |
| 6,041,033 | A | * | 3/2000 | Otsubo et al. ................ 720/707 |
| 2002/0031077 | A1 | * | 3/2002 | Shiwa .......................... 369/271 |
| 2002/0085480 | A1 | * | 7/2002 | Higuchi ....................... 369/271 |
| 2008/0046903 | A1 | * | 2/2008 | Takaki et al. ................ 720/707 |

FOREIGN PATENT DOCUMENTS

| | | | |
|---|---|---|---|
| JP | 63220454 | A * | 9/1988 |
| JP | 5-038115 | | 2/1993 |
| JP | 2000-268461 | | 9/2000 |
| JP | 2003-348812 | | 12/2003 |
| JP | 2004040886 | A * | 2/2004 |
| JP | 2004248332 | A * | 9/2004 |

OTHER PUBLICATIONS

English-Machine Translation of Ogura, Masayuki (JP 2004248332 A), published Sep. 2, 2004.*
English Language Abstract of JP 2003-348812, Published on Dec. 5, 2003.
English Language Abstract of JP 5-038115, Published on Feb. 12, 1993.
English Language Abstract of JP 2000-268461, Published on Sep. 29, 2000.

* cited by examiner

*Primary Examiner*—William J Klimowicz
(74) *Attorney, Agent, or Firm*—Greenblum & Bernstein, P.L.C.

(57) ABSTRACT

A disk drive 1 of the invention has through holes 27 formed in a turntable 4 in such a manner as to surround circumferentially a spindle 5, dislodgement preventive portions 28 provided to extend from a lower surface of a disk holding portion 9 towards a base portion 2 through the through holes 27, a hook locking portion 29 formed on an outer circumferential wall of a bearing holding portion 15 and hook portions 30 formed on distal end portions of the dislodgement preventive portions 28 which lie to a side of the base portion 2. In addition, the base portion 2 of the disk drive 1 of the invention includes a plurality of openings into which respective coils 20 are partially inserted and is configured such that an outer circumferential portion of a stator core 19a and the base portion 2 are spaced apart from each other at a predetermined interval.

2 Claims, 16 Drawing Sheets

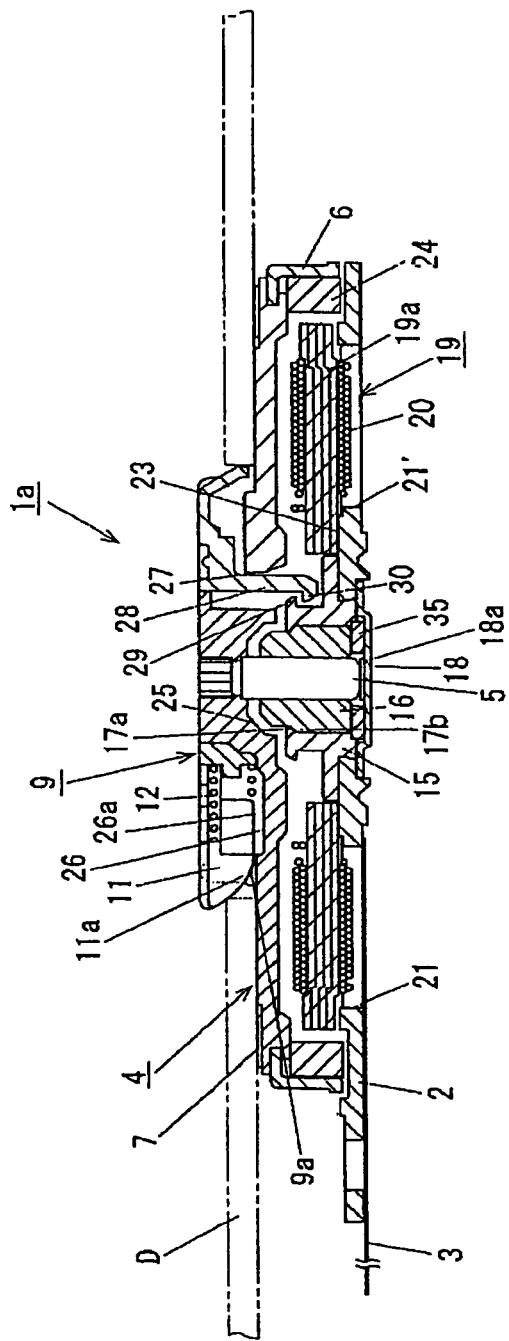
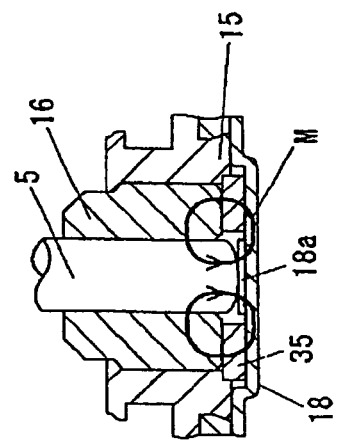

SLIDING DIRECTION

SLIDING DIRECTION

DISK DRIVE

BACKGROUND OF THE INVENTION

1. Field of the Invention

The present invention relates to a disk drive which drives to rotate a disk such as a CD and a DVD which are used as recording media.

2. Description of the Related Art

In recent years, when reading data from and writing data onto disks such as CDs and DVDs which are used as recording media, a method is generally used in which a pickup or read/write head is caused to glide in a radial direction while rotating a disk. As this occurs, a disk drive such as shown in (JP-A-2003-348812) is used as a device for driving to rotate the disk.

Hereinafter, a conventional disk drive will be described using FIG. 15.

FIG. 15 is a sectional view of a main part of a conventional disk drive.

In FIG. 15, reference numeral 100 denotes a conventional disk drive, 101 a base portion, 102 a cylindrical bearing holding portion provided substantially at a central portion on an upper surface of the base portion, 103 a bearing portion held in an inside of the bearing holding portion 102, 104 a thrust plate fittingly fixed in a lower opening of the bearing holding portion 102, 104a a thrust bearing sheet, 105 a stator, which will be described later on, made up of a stator core and coils and provided in such a manner as to surround circumferentially the bearing holding portion 102, 105a a stator core, 105b a coil wound around each of tees of the stator core 105a, 106 a circuit board affixed to the upper surface of the base portion 101, 107 a Hall element electrically connected and fixed to an upper surface of the circuit board 106, 108 a spindle rotatably supported on the bearing portion 103, 109 a turntable fixed to the spindle, 109a an annular yoke made to suspend vertically from an outer circumferential portion of the turntable 109, 110 an annular magnet provided on an inner side of the yoke portion 109a in such a manner as to oppositely face distal end portions of the tees of the stator core 105a, 111 a slip preventive material affixed near an outer circumferential portion of an upper surface of the turntable 109, 112 a disk holding portion provided at a central portion of the upper surface of the turntable 109 to hold a disk placed on the turntable 109, 113 a disk holding claw provided in such a manner as to move into and out of a sliding groove portion formed in such a manner as to extend from an outer circumferential portion of the disk holding portion 112 towards a central portion thereof, 114 a spring provided in an inside of the sliding groove portion so as to bias the disk holding claw 113 in such a manner as to protrude from the outer circumferential portion of the disk holding portion 112, 115 a hook locking portion formed an outer circumferential portion of an upper end portion of the bearing holding portion 102, and 116 a hook portion provided at a predetermined portion on a lower surface of the turntable 109 in such a manner as to be brought into engagement with the hook locking portion 115.

In the conventional disk drive 100 that is configured as has been described above, a plurality of hook portions 116, which are formed by curving a metallic material, are provided around a circumference of the spindle 108, and the hook portions 116 are brought into engagement with the hook locking portion 115 on of the bearing holding portion 102 in such a state that the spindle 108 is securely inserted into the bearing portion 103, whereby the floating of the turntable 109 in association with the removal of an installed disk is prevented to thereby prevent the dislodgement of the spindle 108 from the bearing portion 103.

In addition, the base portion 101 is formed by being punched from a relatively thick sheet metal so as to be imparted a predetermined mechanical strength because a load is exerted thereon when a disk is installed and removed.

The stator core 105a is fixed to the bearing holding portion 102 at an inner circumferential portion thereof and is provided above the base portion 101 at a predetermined interval.

In addition, an annular magnet 117 is adhesion fixed to an upper surface of the inner circumferential portion of the stator core 105a, so that the floating of the turntable 109 while rotating is prevented by virtue of a magnetic attraction force which attracts a lower surface of the turntable 109.

In addition, the base portion 101 and the thrust plate 104 are strongly fixed to the bearing holding portion 102 by plastically deforming annular portions 102a, 102b which are provided on a lower surfaces of the bearing portion 102 through pressing.

Additionally, a predetermined gap 118 is imparted between a lower portion of the disk holding claw 113 and the upper surface of the turntable 109.

Next, a state will be described in which a disk is installed using FIGS. 16(a) to (d) which are sectional views of a main part of the conventional disk drive 100 showing a process of installation of a disk D.

Here, FIG. 16(a) is a sectional view of a main part of the conventional disk drive which shows a state resulting before the installation of the disk D, FIG. 16(b) is a sectional view of the main part of the conventional disk drive which shows a state resulting at an initial stage of the installation of the disk D, FIG. 16(c) is a sectional view of the main part of the conventional disk drive which shows a state resulting at a middle stage of the installation of the disk D, and FIG. 16(d) is a sectional view of the main part of the conventional disk drive which shows a state resulting after the installation of the disk D, with the spring 114 omitted for the purpose of easing the understanding of the process.

Firstly, as shown in FIG. 16(a), a gradient surface 113d which is inclined towards a radially outside of an upper surface portion 113c and a radially outside distal end portion 113b are formed on the disk holding claw 113.

On the other hand, a sliding surface 112a which is inclined radially inwardly is provided on the disk holding portion 112 at a position which oppositely faces a distal end lower surface 113a of the disk holding claw 113.

Next, as shown in FIG. 16(b), the disk holding claw 113 slides in a radially inward direction indicated by an arrow along the sliding surface 112a.

Furthermore, as shown in FIG. 16(c), a sliding amount of the disk holding claw 113 becomes maximum in such a state that an inner circumferential wall of a center hole of the disk D coincides with the distal end portion 113b of the disk holding claw 113.

Then, as shown in FIG. 16(d), while the disk D is brought into engagement at the center hole thereof when the disk is brought into abutment with an upper surface of the slip preventive material 111 and the disk holding claw 113 is biased by the spring 114 (not shown) so as to protrude, since the gap 118 is imparted, the disk holding claw 113 tilts about a fulcrum 112b, and therefore, there is produced a state in which the upper surface 113c of the disk holding claw 113 protrudes further upwards than an upper surface 112c of the disk holding portion 112.

The gradient surface 113d which is inclined radially outwardly is provided on an upper surface on a radially outside of the disk holding claw 113 with a view to reducing a protruding amount which is a vertical distance between the upper surface 113c of the disk holding claw 113 and the upper surface 112 of the disk holding portion 112 as one of the purposes of the provision thereof.

On the other hand, a spindle motor, in which a plurality of window portions are opened along a circumferential direction of a base plate at predetermined intervals, is disclosed in (P JP-A-5-38115) as a conventional spindle motor that is used as a drive portion of the conventional disk drive.

According to Patent Document No. 2, an axial length can be reduced by allowing part of each winding portion of a stator to enter the window portion, thereby making it possible to realize the thinning of the disk drive as a whole. Note that the stator is fixed to the base plate in such a state that an annular main body portion and distal end portions of tees of a stator core are brought into abutment with circumferential edge portions of the window portions.

However, the conventional techniques have had the following problems.

(1) In the conventional general disk drives, since the turntable is made by drawing or cutting a sheet metal, there have been caused problems that the weight of the turntable so made is increased, and when the thickness of the turntable is attempted to be reduced with a view to reducing the weight and thickness thereof, the strength of the turntable is decreased, and that a complex and trouble some working is required for a center portion thereof where a spindle is to be fixed.

(2) In addition, since it is a general practice to form the turntable into a flat shape by drawing or cutting a sheet metal, there has been caused a problem that an unnecessary space is produced between a lower surface of the turntable and the bearing portion and the bearing holding portion, and hence the overall thickness of the disk drive becomes thick, making it difficult to make the disk drive thinner.

(3) Since the hook portions 116 is made up of a separate member from the turntable 109, there have been caused problems that the number of component is increased and that the number of manufacturing manhours required for a press bonding or welding process of fixing the hook portion 16 to the lower surface of the turntable 109 is increased, and additionally, since when attempting to thin the disk drive 100, a vertical length of the hook portion 116 is reduced, there has been caused a problem that a sufficient flexibility cannot be imparted to the hook portion 116, thereby making it difficult to mount the hook portion on the turntable 109.

(4) Since the disk holding claw 113 is not only pushed to a center side of the disk holding portion 112 but also slides downwards when the disk D is installed, there has been caused a problem that the predetermined gap 118 becomes necessary on the upper surface side of the turntable 119 for allowing the disk holding claw 113 to slide downwards, this increasing the overall thickness of the disk drive.

(5) In addition, since a punched sheet metal is used as the base portion 101, there have been caused problems that not only the thickness but also the weight of the disk drive is increased, thereby making it difficult to reduce the weight and thickness of the disk drive and that when attempting to reduce the thickness, the mechanical strength thereof is reduced.

In particular, since a large magnitude of external force is exerted on the base portion 101 via the spindle 108 and the bearing portion 103 when the disk D is installed and removed, a predetermined strength is required. Note that as with the spindle motor in (Patent Document No. 2), while in the event that the distal end portions of the tees of the stator core are brought into abutment with the base plate, a predetermined strength can be obtained, since the stator core and the base plate are made to abut with each other, there has been caused a problem that a magnetic circuit made up of the stator core and the magnet becomes unstable, the efficiency being thereby deteriorated.

(6) Since the circuit board 106 is normally disposed at a lower portion of the stator 105, a large gap needs to be provided between the stator 105 and the base portion 101, there has been caused a problem that a height from a mounting surface (the upper surface of the base portion 101) via which the disk drive is mounted in a housing which constitutes a place where the disk drive is to be mounted and the upper surface of the disk holding portion 112 is increased, thereby making it impossible to realize the thinning of the disk drive.

(7) Since the disk drive 100 needs to be mounted on the housing via a spacer, there has been caused a problem that the number of components is increased, and since dimensional errors are accumulated, there has been caused a problem that the mounting tolerance is increased.

(8) Since there is provided the annular magnet 117 which generates the magnetic attraction force which attracts the turntable 109, a rotating magnetic force is generated relatively by virtue of the rotation of the turntable 109, and the gap between the lower surface of the turntable 109 and the annular magnet 117 differs depending upon positions due to assembling errors or the like, whereby a variation in gap is generated by virtue of the rotation of the turntable 109, a problem being thereby caused that a magnetic loss is generated to thereby deteriorate the efficiency and increase the noise.

(9) In addition, since the annular magnet 117 is provided on the upper surface of the stator core 105a, a space becomes necessary between the turntable 109 and the stator 105 for accommodating the annular magnet 117, a problem being thereby caused that the thinning of the disk drive cannot be realized.

(10) There is caused the state in which the disk holding claw 113 is tilted about the fulcrum 112b after the disk D has been installed due to the effect of the predetermined gap 118 provided between the lower portion of the disk holding claw 113 and the upper surface of the turntable 109, whereby the upper surface 113c of the disk holding claw 113 protrudes further upwards than the upper surface 112c of the disk holding portion 112, and even in the event that the gradient surface 113d is provided with a view to rectifying the protruding state, a height-ways space becomes necessary for the gradient surface 113d so provided, a problem being thereby caused that the thinning of the disk drive is difficult to be realized.

(11) When the thinning of the disk drive proceeds, mechanical dimensions and accuracy inside the disk drive need to be exacting, and as a result, the frequency with which the disk drive is disassembled for rectification is estimated to be increasing. However, as this actually occurs, since the hook portions 116 are provided on the lower surface of the turntable 109, a direct pressing force cannot be applied to the hook portions 116, a problem being thereby caused that the disassembling for rectification becomes difficult once the disk drive has been assembled.

(12) Since the base portion 101 is strongly fixed to the bearing holding portion 102 by plastically deforming the annular portions provided on the lower side of the bearing holding portion 102 through pressing, it becomes difficult to secure a vertical accuracy of the bearing portion 103 based on the mounting surface provided on the base portion 101 via which the disk drive is mounted in the housing due to the effect of the warping of the base portion 101, and additionally, dispersion in height based on the mounting surface tends to be generated easily, a problem being thereby provided that the thinning of the disk drive is difficult to be realized.

SUMMARY OF THE INVENTION

The invention was made to solve the problems inherent in the conventional techniques, and an object thereof is to provided a disk drive which can facilitate the installation work of the turntable and ensure the prevention of dislodgement without reducing the flexibility of the dislodgement preventive portion even when the overall thickness of the disk drive is reduced and which can reduce the unnecessary space underneath the lower surface of the turntable to thereby enable the reduction in thickness and weight of the disk drive.

In addition, the invention was made to solve the problems inherent in the conventional techniques and an object thereof is to provide a disk drive which can reduce the thickness and weight of the base portion to thereby reduce the overall thickness and weight thereof while maintaining the strength of the base portion 101 and the stability of the magnetic circuit at the outer circumferential portion of the stator core and which can further enable the improvement in soldering work that is to be implemented on the circuit board, as well as the improvement in accuracy and workability which are required when the disk drive is mounted in the housing.

With a view to solving the problems, according to an aspect of the invention, there is provided a disk drive including a base portion, a cylindrical bearing holding portion provided substantially at a central portion of the base portion, a bearing portion held in an inside of the bearing holding portion, a stator provided in such a manner as to surround circumferentially the bearing portion, a spindle rotatably supported on the bearing portion, a turntable fixed to the spindle, an annular yoke provided on an outer circumferential portion of the turntable, an annular magnet provided on an inner side of the yoke in such a manner as to oppositely face the stator, and a disk holding portion provided at a central portion on an opposite surface of the turn table to the base portion, the disk drive including one or a plurality of through holes formed in the turntable in such a manner as to surround circumferentially the spindle, one or a plurality of dislodgement preventive portions provided to extend from the disk holding portion towards the base portion through the respective through holes, a hook locking portion formed on an outer circumferential wall of the bearing holding portion and hook portions formed on distal end portions of the dislodgement preventive portions which lie to a side of the base portion.

By this configuration, there can be provided the disk drive which can facilitate the turntable installation work and ensure the prevention of the dislodgement thereof without reducing the flexibility of the dislodgement preventive portion and which can reduce the unnecessary space such as underneath the surface of the turntable which lies to oppositely face the base portion to thereby enable the reduction in thickness and weight of the disk drive even when the entirety of the disk drive is thinned.

With a view to solving the problems, according to another aspect of the invention, there is provided a disk drive including a base portion, a cylindrical bearing holding portion provided substantially at a central portion of the base portion, a bearing portion held in an inside of the bearing holding portion, a stator provided in such a manner as to surround circumferentially the bearing portion, a spindle rotatably supported on the bearing portion, a turntable fixed to the spindle, an annular yoke provided on an outer circumferential portion of the turntable, an annular magnet provided on an inner side of the yoke in such a manner as to oppositely face the stator, and a disk holding portion provided at a central portion on an opposite surface of the turn table to the base portion, wherein the base portion includes a plurality of openings into which coils of the stator are partially inserted, respectively, and an outer circumferential portion of a stator core of the stator is spaced apart from the base portion at a predetermined interval.

By this configuration, there can be provided the disk drive which can reduce the thickness and weight of the base portion to thereby reduce the overall thickness and weight thereof while maintaining the strength of the base portion 101 and the stability of the magnetic circuit at the outer circumferential portion of the stator core and which can further enable the improvement in soldering work that is to be implemented on the circuit board, as well as the improvement in accuracy and workability which are required when the disk drive is mounted in the housing.

As has been described heretofore, according to the disk drive of the invention, the following advantages can be obtained.

According to a first aspect of the invention, since the dislodgement preventive portions are provided to extend from the disk holding portion towards the base portion through the respective through holes, a sufficient flexibility can be obtained even when the entirety of the disk drive is thinned, whereby the turntable can easily be installed and can be brought into engagement in an ensured fashion to thereby prevent the dislodgement thereof.

According to a second aspect of the invention, in addition to the advantage provided by the first aspect of the invention, since a reduction in weight can be enabled and the workability can be increased to thereby form with ease predetermined recessed and raised portions so as to eliminate unnecessary spaces on upper and lower surfaces thereof by forming the turntable from a synthetic resin, it is possible to provide a disk drive which can be thinned as the entirety thereof According to a third aspect of the invention, in addition to the advantage provided by the first or second aspect of the invention, since a recessed portion which follows external shapes of the bearing holding portion and the bearing portion is formed on a circumferential portion of the spindle fixed to the central portion of the turntable which oppositely faces the base portion, the production of an unnecessary space between the surface of the turntable which oppositely faces the base portion and the baring portion and the bearing holding portion can be prevented, thereby making it possible to provide a disk drive which can be thinned as the entirety thereof.

According to a fourth aspect of the invention, in addition to the advantage provided by any of the first to third aspects of the invention, since the disk holding portion can be fixed to the turntable only by allowing a fixing hole portion to be fitted on a holding portion fixing portion, whereby the mounting work is eased and the mounting is implemented with a high position accuracy, and since a locking raised portion is formed on an inner circumferential wall of the fitting portion, the fixing hole portion can be fitted to be fixed on the holding portion fixing portion without an adhesive material or the like, and hence, it is possible to provide a disk drive which can ease the mounting work and reduce the number of working man-hours to thereby provide a superior productivity.

According to a fifth aspect of the invention, in addition to the advantage provided by any of the first to fourth aspects of the invention, since oscillation relief grooves are formed, respectively, at positions which substantially oppositely face disk holding claws on a surface of the turntable which is opposite to the surface thereof which oppositely faces the base portion, in the event that the disk holding claws are oscillated when a disk is installed onto and removed from the disk holding portion, portions of the disk holding claws which lie to a side of the turntable can relieved into the oscillation relief grooves, whereby the installation and removal of the disk can be implemented smoothly. In addition, the height of the disk holding portion is not increased, thereby making it possible to provided a disk drive which can be thinned as the entirety thereof.

According to a sixth aspect of the invention, since openings are formed in the base portion, the weight of the base portion can be reduced to thereby reduce the weight of the entirety of the disk drive, and since the stator can be provided at a lower position by allowing part of coils to pass through the openings, the thickness of the entirety of a system in which the disk drive is installed can be reduced. In addition, since an outer circumferential portion of a stator core and the base portion are spaced apart from each other at a predetermined interval, a magnetic circuit can be stabilized, the efficiency can be increased and noise can be reduced, and in the event that a large magnitude of load is applied to the base portion when a disk is installed on to the disk holding portion, the base portion is deformed so that a lower surface of the outer circumferential portion of the stator core is brought into abutment with the base portion, whereby deformation stress can be dispersed not only to a center portion of the base portion but also to a peripheral portion thereof, thereby making it possible to provide a disk drive which has a superior mechanical strength.

According to a seventh aspect of the invention, in addition to the advantage provided by the sixth aspect of the invention, since the mechanical strength of the base portion can be increased by providing a raised base portion even when the entirety of the base portion is formed thin, and since a surface of the outer circumferential portion of the stator core which oppositely faces the base portion is brought into the thick raised base portion, there can be provided a disk drive which is so superior in mechanical strength that the deformation stress applied to the base portion can be borne by the raised base portion.

According to an eighth aspect of the invention, in addition to the advantage provided by the sixth or seventh aspect of the invention, since a stepped portion is formed on the outer circumferential portion of the stator core, not only can the raised base portion easily be formed on the base portion without increasing the height of the entirety of the disk drive but also the outer circumferential portion of the stator core and the base portion can be spaced apart from each other at a predetermined interval, thereby making it possible to provide a disk drive which can not only stabilize the magnetic circuit but also increase the efficiency.

According to a ninth aspect of the invention, in addition to the advantage provided by any of the sixth to eighth aspects of the invention, since a circuit board is provided on an opposite surface of the base portion to the surface thereof on which the stator is provided, there is no need to insert a circuit board or form a gap for the circuit board between the turntable and the base portion as is inherent in the conventional techniques, whereby a height from the turntable side surface of the base portion which constitutes the mounting surface to the housing where the disk drive is housed to an uppermost surface on an outer side of the disk holding portion can be suppressed to a lower level, and hence, since not only can a reduction in the thickness of the entirety of the system in which the disk drive is actually installed be realized but also the heat of a soldering bit is not dissipated via the base portion, there can be provided a disk drive which has a superior workability in implementing soldering work.

According to a tenth aspect of the invention, in addition to the advantage provided by any of the first to ninth aspects of the invention, since a mounting raised portion is formed on the base portion, the number of components can be reduced and mounting errors can be reduced, and additionally, by forming the mounting raised portion by pressing using a die, there can be provided a disk drive which facilitates the adjustment of the height of the mounting raised portion and has a superior productivity.

According to an eleventh aspect of the invention, in addition to the advantage provided by any of the first to tenth aspects of the invention, since an axial movement of the bearing portion can be prevented by virtue of an engagement between a bearing portion dislodgement preventive raised portion and a dislodgement preventive locking portion and by a thrust plate, even in the event that the bearing holding portion is formed from a synthetic resin, there can be provided a disk drive in which the bearing holding portion is made to hold the bearing portion in an ensured fashion.

According to a twelfth aspect of the invention, in addition to the advantage provided by any of the first to eleventh aspects of the invention, there is generated little rotating magnetic field compared to the conventional technique in which the magnet is provided on the upper surface of the stator so as to attract the turn table, and since there is nothing that is affected by a gap variation between the turntable and the magnet (a variation in gap due to the rotation of the turntable) and nonalignment of gaps (difference in gap generated depending on positions due to errors at the time of assembling), there can be provided a disk drive which can reduce a loss attributed to the variation in magnetic field and deterioration by noise, and additionally, since no space where to provide the magnet is necessary between the turntable and the stator, there can be provided a disk drive which can be thinned.

According to a thirteenth aspect of the invention, in addition to the advantage provided by any of the first to fourth aspects of the invention, since tilting restricting raised portions are provided, respectively, on inner sides of radial lower portions of the disk holding claws, the upwardly protruding amount of the disk holding claws due to the tilting thereof after a disk has been installed is reduced, and since accommodating recessed portions are formed, respectively, in the oscillation relief grooves on the turntable in such a manner as try accommodate therein the tilting restricting raised portions, there can be provided a disk drive which can be thinned without damaging the easiness with which the disk installation work is implemented.

According to a fourteenth aspect of the invention, in addition to the advantage provided by any of the first to thirteenth aspects of the invention, since hook portions are dislocated to thereby remove the disk holding portion by passing a disassembling jig through disassembling grooves which are provided in such a manner as to extend from a surface of the disk holding portion onto which a disk is installed towards the base portion and directly pressing the dislodgement preventive portion in a radially outward direction so as to press open the same dislodgement preventive portion, there can be provided a disk drive which can facilitate the disassembly of the disk drive.

According to a fifteenth aspect of the invention, in addition to the advantage provided by the fourteenth aspect of the invention, since the disk holding portion can be removed even when the disk drive is made smaller in size by providing disassembling auxiliary groove portions to extend in such a manner as to oppositely face the disassembling groove portions which are provided in such a manner as to extend from a surface of the holding fixing portion on to which a disk is installed towards the base portion, there can be provided a disk drive which can facilitate the disassembly of the disk drive.

According to a sixteenth aspect of the invention, in addition to the advantage provided by any of the first to sixth aspects of the invention, since the securing of a vertical accuracy of the bearing portion based on a surface of a mounting hole portion provided in the base portion to mount the disk drive onto a housing where to house the disk drive which lies to a side from which a disk is inserted can be facilitated and assembling after a positional restriction on an assembling base surface has been implemented can be enabled, the disk drive is difficult to be affected by the warping of the base portion, and additionally, since dispersion in inclination of a center of the bearing portion and dispersion in height of the disk drive can be reduced, there can be provided a disk drive which can be made thinner.

BRIEF DESCRIPTION OF THE DRAWINGS

FIG. 7(a) is a sectional view of a main part of a disk drive according to Embodiment 2, and (b) is an enlarged sectional view of a main part of a bearing portion.

DESCRIPTION OF THE PREFERRED EMBODIMENTS

Figure 1:
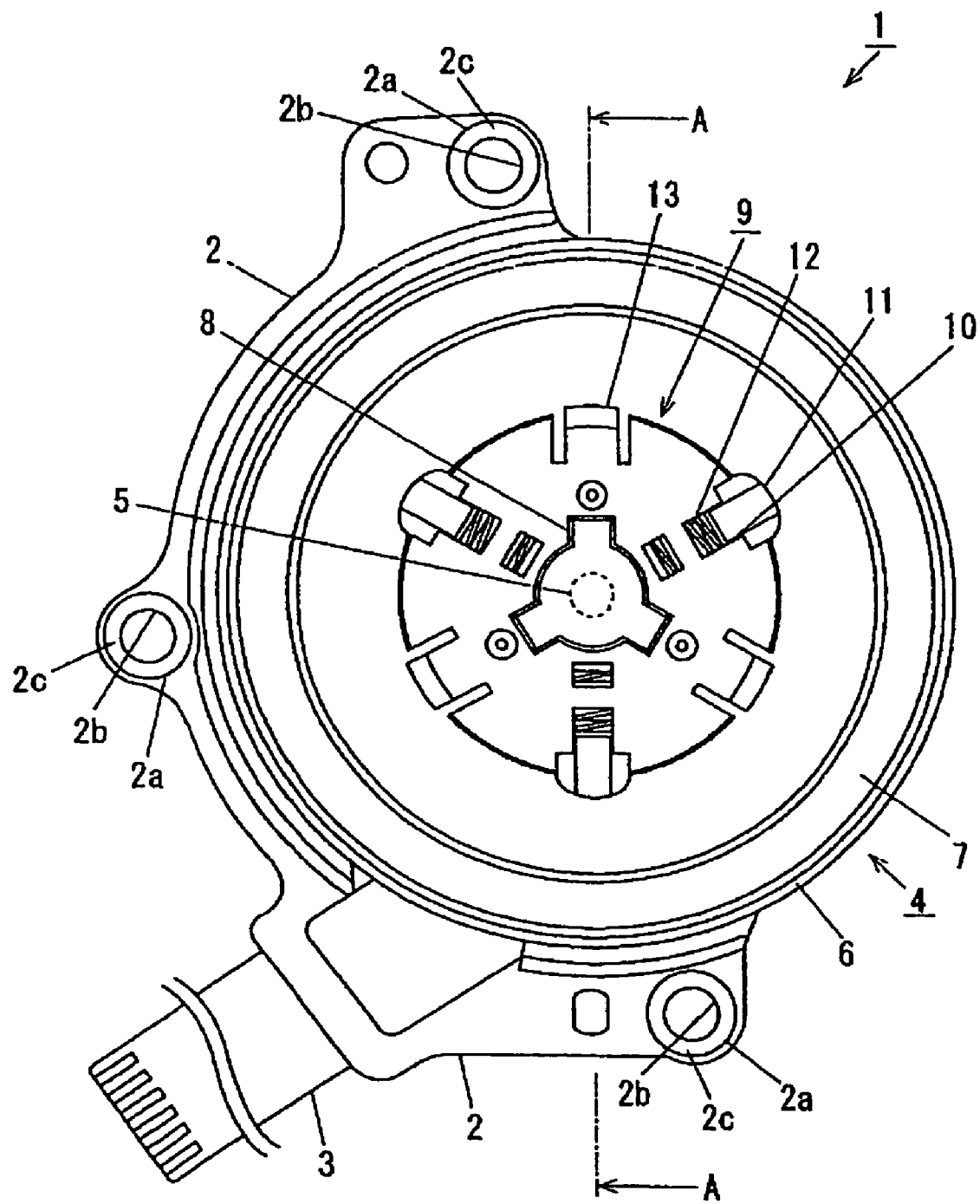
FIG. 1 is a plan view of a disk drive according to Embodiment 1.

The invention realizes the achievement of its object to provide a disk drive which can facilitate the turntable installation work and ensure the prevention of the dislodgement thereof without reducing the flexibility of the dislodgement preventive portion and which can reduce the unnecessary space such as underneath the surface of the turntable which lies to oppositely face the base portion to thereby enable the reduction in thickness and weight of the disk drive even when the entirety of the disk drive is thinned by including one or a plurality of through holes formed in the turntable in such a manner as to surround circumferentially the spindle, one or a plurality of dislodgement preventive portions provided to extend from the disk holding portion towards the base portion through the respective through holes, a hook locking portion formed on an outer circumferential wall of the bearing holding portion and hook portions formed on distal end portions of the dislodgement preventive portions which lie to a side of the base portion.

In addition, the invention realizes the achievement of its object to provide a disk drive which can reduce the thickness and weight of the base portion to thereby reduce the overall thickness and weight thereof while maintaining the strength of the base portion 101 and the stability of the magnetic circuit at the outer circumferential portion of the stator core and which can further enable the improvement in soldering work that is to be implemented on the circuit board, as well as the improvement in accuracy and workability which are required when the disk drive is mounted in the housing by the configuration in which the base portion includes a plurality of openings into which coils of the stator are partially inserted, respectively, and in which an outer circumferential portion of a stator core of the stator is spaced apart from the base portion at a predetermined interval.

According to the first aspect of the invention that was made with a view to solving the aforesaid problem, there is provided a disk drive including a base portion, a cylindrical bearing holding portion provided substantially at a central portion of the base portion, a bearing portion held in an inside of the bearing holding portion, a stator provided in such a manner as to surround circumferentially the bearing portion, a spindle rotatably supported on the bearing portion, a turntable fixed to the spindle, an annular yoke provided on an outer circumferential portion of the turntable, an annular magnet provided on an inner side of the yoke in such a manner as to oppositely face the stator, and a disk holding portion provided at a central portion on an opposite surface of the turntable to the base portion, the disk drive including one or a plurality of through holes formed in the turntable in such a manner as to surround circumferentially the spindle, one or a plurality of dislodgement preventive portions provided to extend from the disk holding portion towards the base portion through the respective through holes, a hook locking portion formed on an outer circumferential wall of the bearing holding portion and hook portions formed on distal end portions of the dislodgement preventive portions which lie to a side of the base portion.

By this configuration, the following function is provided.

(1) Since the dislodgement preventive portions are provided to extend from the disk holding portion towards the base portion through the respective through holes, the dislodgement preventive portion has a sufficient length even when the entirety of the disk drive is thinned to thereby be able to obtain such a sufficient flexibility to allow the hook portions to be brought into engagement with the hook locking portion, whereby the turntable can easily be installed on to the base portion and can be brought into engagement therewith in an ensured fashion to thereby prevent the dislodgement thereof from the base portion.

According to the second aspect of the invention that was made with a view to solving the aforesaid problem, there is provided a disk drive according to the first aspect of the invention, wherein the turntable is molded integrally with the spindle and the yoke through insert molding.

By this configuration, the following function is provided in addition to the function provided by the first aspect of the invention.

(1) Since most of the turntable is formed from a synthetic resin by molding the turntable integrally with the spindle and the yoke through insert molding, a reduction in weight can be enabled and the workability can be increased to thereby form with ease predetermined recessed and raised portions so as to eliminate unnecessary spaces on upper and lower surfaces thereof, whereby the disk drive can be thinned as the entirety thereof.

According to the third aspect of the invention that was made with a view to solving the aforesaid problem, there is provided a disk drive according to the first or second aspect of the invention, wherein the turntable has a recessed portion which follows external shapes of the bearing holding portion and the bearing portion on a circumferential portion of the spindle fixed to the central portion thereof which oppositely faces the base portion.

By this configuration, the following function is provided in addition to the function provided by the first or second aspect of the invention.

(1) Since the recessed portion which follows the external shapes of the bearing holding portion and the bearing portion is formed on the circumferential portion of the spindle fixed to the central portion of the turntable which oppositely faces the base portion, the production of an unnecessary space between the surface of the turntable which oppositely faces the base portion and the baring portion and the bearing holding portion can be prevented while providing a sufficient height for the bearing portion and the bearing holding portion to stably hold the spindle, thereby making it possible to allow the disk drive to be thinned as the entirety thereof.

According to the fourth aspect of the invention that was made with a view to solving the aforesaid problem, there is provided a disk drive according to any of the first to third aspects of the invention, including a holding portion fixing portion which fixes the disk holding portion provided substantially at a central portion of a surface of the turntable which is opposite to the surface thereof which oppositely faces the base portion in such a manner as to protrude therefrom, a protruding portion formed on an outer circumferential portion of the holding portion fixing portion, a fixing hole formed substantially at the central portion of the disk holding portion through which the holding portion fixing portion is passed, a recess-shaped fitting portion formed on an inner circumferential wall of the fixing hole into which the protruding portion is fitted and a locking raised portion formed on an inner circumferential wall of the fitting portion in such a manner as to be locked on the protruding portion.

By this configuration, the following functions are provided in addition to the function provided by any of the first to third aspect of the invention.

(1) Since the disk holding portion can be fixed to the turntable only by allowing the fixing hole portion to be fitted on the holding portion fixing portion, whereby the mounting work is eased and the mounting is implemented with a high position accuracy.

(2) Since the locking raised portion is formed on the inner circumferential wall of the fitting portion, the fixing hole portion can be fitted to be fixed on the holding portion fixing portion without an adhesive material or the like, and hence, it is possible not only to ease the mounting work but also to reduce the number of working manhours.

According to the fifth aspect of the invention that was made with a view to solving the aforesaid problem, there is provided a disk drive according to any of the first to fourth aspects of the invention, wherein the disk holding portion includes a plurality of sliding groove portions formed thereon in such a manner as to extend from an outer circumferential portion to a central portion thereof, disk holding claws provided in such a manner as not only to freely move, respectively, into and out of the sliding groove portions but also to oscillate vertically through a predetermined angle in the sliding groove portions, and spring portions provided, respectively, in the sliding groove portions so as to bias the disk holding claws in such a manner as to protrude from an outer circumferential portion of the disk holding portion, wherein oscillation relief grooves are formed, respectively, at positions which substantially oppositely face the disk holding claws on the surface of the turntable which is opposite to the surface thereof which oppositely faces the base portion.

By this configuration, there is provided the following function in addition to the function or functions provided by any of the first to fourth aspects of the invention.

(1) Since the oscillation relief grooves are formed on the upper surface of the turntable, in the event that the disk holding claws are oscillated when a disk is installed onto and removed from the disk holding portion, the spring holding raised portions or the like of the disk holding claws can relieved into the space of the oscillation relief grooves, whereby the installation and removal of the disk can be implemented smoothly. In addition, since a tall height does not have to be provided in order to allow the spring holding raised portions of the like to be relieved into the lower portions of the disk holding claws, it is possible to allow the disk drive to be thinned as the entirety thereof.

According to the sixth aspect of the invention that was made with a view to solving the aforesaid problem, there is provided a disk drive including a base portion, a cylindrical bearing holding portion provided substantially at a central portion of the base portion, a bearing portion held in an inside of the bearing holding portion, a stator provided in such a manner as to surround circumferentially the bearing portion, a spindle rotatably supported on the bearing portion, a turntable fixed to the spindle, an annular yoke provided on an outer circumferential portion of the turntable, an annular magnet provided on an inner side of the yoke in such a manner as to oppositely face the stator, and a disk holding portion provided at a central portion on an opposite surface of the turn table to the base portion, wherein the base portion includes a plurality of openings into which coils of the stator are partially inserted, respectively, and an outer circumferential portion of a stator core of the stator is spaced apart from the base portion at a predetermined interval.

By this configuration, the following functions are provided.

Since the openings are formed in the base portion, the weight of the base portion can be reduced to thereby reduce the weight of the entirety of the disk drive, and since the stator can be provided at a lower position by allowing part of the coils that are wound around the respective tees of the stator core to pass through the openings, the thickness of the entirety of the system including the disk drive can be reduced.

(2) Since the outer circumferential portion of the stator core and the base portion are spaced apart from each other at the predetermined interval, the magnetic circuit at the outer circumferential portion of the stator core can be stabilized, the efficiency can be increased and noise can be reduced.

(3) Since in the event that a large magnitude of load is applied to the base portion when a disk is installed on to the disk holding portion, the base portion is deformed so that the surface of the outer circumferential portion of the stator core which lies to face the base portion is brought into abutment with the base portion, whereby deformation stress can be dispersed not only to the center portion of the base portion but also to the peripheral portion thereof, thereby making it possible to maintain the superior mechanical strength.

According to the seventh aspect of the invention that was made with a view to solving the aforesaid problem, there is provided a disk drive according to the sixth aspect of the invention, wherein the base portion includes a raised base portion which oppositely faces the outer circumferential portion of the stator core.

By this configuration, the following functions are provided in addition to the functions provided by the sixth aspect of the invention.

(1) Since the mechanical strength of the base portion can be increased by providing the raised base portion whose thickness is increased locally even when the entirety of the base portion is formed thin.

(2) Since the surface of the outer circumferential portion of the stator core which oppositely faces the base portion is brought into the raised base portion whose thickness is locally increased when the large magnitude of load is applied to the base portion, the deformation stress applied to the base portion can be borne by the raised base portion to thereby increase the mechanical strength.

According to the eighth aspect of the invention, there is provided a disk drive according to the sixth aspect of the invention, wherein the stator core includes a stepped portion which is formed on the outer circumferential portion thereof.

By this configuration, the following functions are provided in addition to the function provided by the sixth or seventh aspect of the invention.

(1) Since the stepped portion is formed on the outer circumferential portion of the stator core, the raised base portion can easily be formed on the base portion without increasing the height of the entirety of the disk drive.

(2) Even in the event that the raised base portion is formed on the base portion, the outer circumferential portion of the stator core and the base portion can be spaced apart from each other at a predetermined interval by the stepped portion so formed, thereby making it possible to stabilize the magnetic circuit at the outer circumferential portion of the stator bore.

According to the ninth aspect of the invention that was made with a view to solving the aforesaid problem, there is provided a disk drive according to any of the sixth to eighth aspects of the invention, wherein a circuit board to which lead wires of the coils of the stator are connected is provided on an opposite surface of the base portion to the surface thereof on which the stator is provided.

By this configuration, the following functions are provided in addition to the functions provided by any of the sixth to eighth aspects of the invention.

(1) Since the circuit board is provided on the lower surface of the base portion, there is no need to insert a circuit board or form a gap for the circuit board between the turntable and the base portion as is inherent in the conventional techniques, whereby a height from the upper surface of the base portion which constitutes the mounting surface to the housing where the disk drive is housed to the upper surface of the disk holding portion can be suppressed to a lower level, and hence, a reduction in the thickness of the entirety of the system in which the disk drive is actually installed can be realized.

(2) Since the heat of a soldering bit is not dissipated via the base portion, workability in implementing soldering work can be increased.

According to the tenth aspect of the invention that was made with a view to solving the aforesaid problem, there is provided a disk drive according to any of the first to ninth aspects of the invention, wherein the base portion includes a mounting raised portion which enables the mounting of the disk drive on a drive housing where the disk drive is installed.

By this configuration, the following function is provided in addition to the function or functions provided by any of the first to ninth aspects of the invention.

(1) Since the mounting raised portion is formed on the base portion, there is no need to provide a separate spacer as in the case with the conventional techniques, whereby the mounting errors can be reduced, and by forming the mounting raised portion by pressing using a die, the adjustment of the height of the mounting raised portion can be facilitated by selecting dies.

According the eleventh aspect of the invention that was made with a view to solving the aforesaid problem, there is provided a disk drive according to any of the first to tenth aspects of the invention, including a bearing portion dislodgement preventive raised portion formed at a terminal end portion of the bearing holding portion which lies to a side of the turntable in such a manner as to directed inwardly, a dislodgement preventive locking portion formed on the bearing portion in such a manner as to be brought into engagement with the dislodgement preventive raised portion and a thrust plate fixed to the base portion and provided in such a manner as to oppositely face the bearing portion.

By this configuration, the following function is provided in addition to the function or functions provided by any of the first to tenth aspects of the invention.

(1) Since an axial movement of the bearing portion can be prevented by virtue of an engagement between the bearing portion dislodgement (preventive raised portion and the dislodgement preventive locking portion and by the thrust plate, even in the event that the bearing holding portion is formed from a synthetic resin, the bearing holding portion is made to hold the bearing portion in an ensured fashion.

According to the twelfth aspect of the invention that was made with a view to solving the aforesaid problem, there is provided a disk drive according to any of the first to eleventh aspects of the invention, including an annular spindle attracting magnet which is provided on a side of the shaft portion which lies to a side of the base portion and by which a distal end portion of the spindle which lies to the side of the base portion is surrounded.

By this configuration, the following functions are provided in addition to the function or functions provided by any of the first to eleventh aspects of the invention.

(1) Since a magnetic flux which passes through the spindle made of a magnetic material is generated from the spindle attracting magnet via the bearing portion made of a magnetic material so as to form a magnetic circuit to thereby attract the spindle towards a side of the base portion, the spindle can be prevented from being dislodged.

(2) Since there is generated little rotating magnetic field compared to the conventional technique in which the magnet is provided on the surface of the stator which lies to the side of the turntable so as to attract the turn table, and since there is nothing that is affected by a gap variation between the turntable and the magnet and nonalignment of gaps, it is possible to reduce a loss attributed to the variation in magnetic field and deterioration by noise, and additionally, since no space where to provide the magnet is necessary between the turntable and the stator, the disk drive can be thinned.

According to the thirteenth aspect of the invention that was made with a view to solving the aforesaid problem, there is provided a disk drive according to any of the first to fourth aspects of the invention, wherein the disk holding portion includes a plurality of sliding groove portions formed thereon in such a manner as to extend from an outer circumferential portion to a central portion thereof, disk holding claws provided in such a manner as to freely move, respectively, into and out of the sliding groove portions, and spring portions provided, respectively, in the sliding groove portions so as to bias the disk holding claws in such a manner as to protrude from an outer circumferential portion of the disk holding portion, wherein oscillation relief grooves are formed, respectively, at positions which substantially oppositely face the disk holding claws on the surface of the turntable which is opposite to the surface thereof which oppositely faces the base portion, wherein tilting restricting raised portions are provided, respectively, on radially inward surfaces of the disk holding claws which oppositely face the side of the turntable, and wherein accommodating recessed portions are formed, respectively, in the oscillation relief grooves on the turntable in such a manner as to accommodate therein the tilting restricting raised portions in such a state that the disk holding claws are slid inwards to a maximum extent when a disk is installed.

By this configuration, the following function is provided in addition to the function provided by any of the first to fourth aspects of the invention.

(1) Since the tilting restricting raised portions are provided, respectively, on the inner sides of the radial lower portions of the disk holding claws, the upwardly protruding amount of the disk holding claws due to the tilting thereof after a disk has been installed is reduced, and since the accommodating recessed portions are formed, respectively, in the oscillation relief grooves in such a manner as to accommodate therein the tilting restricting raised portions, the disk drive can be thinned without damaging the easiness with which the disk installation work is implemented.

According to the fourteenth aspect of the invention that was made with a view to solving the aforesaid problem, there is provided a disk drive according to any of the first to thirteenth aspects of the invention, wherein disassembling grooves are provided on radially inward sides of the dislodgement preventing portions in such a manner as to extend from a surface of the disk holding portion onto which a disk is installed towards the base portion and gradient surfaces are provided at terminal end portions of the disassembling grooves in the extending direction in such a manner as to be inclined radially inwardly.

By this configuration, the following function is provided in addition to the function or functions provided by the first to thirteenth aspects of the invention.

(1) Since the hook portions are dislocated to thereby remove the disk holding portion by passing the disassembling jig through the disassembling grooves which are provided in such a manner as to extend from the surface of the disk holding portion onto which a disk is installed towards the base portion and allowing the jig claws of the disassembling jig to be brought into contact with the radially inwardly inclined gradient surfaces which are provided at the terminal end portions of the disassembling grooves in the extending direction to thereby directly press the dislodgement preventive portion in the radially outward direction so as to press open the same dislodgement preventive portion, the disassembly of the disk drive can be facilitated.

According to the fifteenth aspect of the invention that was made with a view to solving the aforesaid problem, there is provided a disk drive according to the fourteenth aspect of the invention, wherein disassembling auxiliary groove portions are provided in such a manner as to oppositely face the disassembling groove portions, respectively, and to extend from a surface of the holding portion fixing portion provided substantially at the central portion of the turntable in such a manner as to protrude therefrom so as to fix the disk holding portion onto which a disk is installed towards the base portion.

According to the fifteenth aspect of the invention that was made with a view to solving the aforesaid problem, the following function is provided in addition to the function provided by the fourteenth aspect of the invention.

(1) Since the disk holding portion can be removed even when the disk drive is made smaller in size, the disassembly of the disk drive be facilitated.

According to the sixteenth aspect of the invention that was made with a view to solving the aforesaid problem, there is provided a disk drive according to the first or sixth aspect of the invention, wherein a thrust plate is provided in such a manner as to oppositely face the bearing portion so as to support a distal end portion of the spindle which lies to the side of the base portion, wherein at least a mounting hole portion is provided on the base portion which enables the mounting of the disk drive to a housing which is to house the disk drive, gap portions are provided, respectively, between the bearing holding portion and the base portion and between the thrust plate and the base portion in a direction which intersects an axial direction of the spindle, and wherein an adhesive is filled in the gap portions.

By this configuration, the following function is provided in addition to the function or functions provided by the first or sixth aspect of the invention.

(1) Since the securing of a vertical accuracy of the bearing portion based on the surface of the mounting hole portion provided in the base portion to mount the disk drive onto the housing where to house the disk drive which lies to the side from which a disk is inserted can be facilitated and assembling after a positional restriction on the assembling base surface has been implemented can be enabled, the disk drive is difficult to be affected by the warping of the base portion, and additionally, since dispersion in inclination of a center of the bearing portion and dispersion in height of the disk drive can be reduced, the disk drive can be made thinner.

Hereinafter, while embodiments will be described using the accompanying drawings, in the respective drawings, with a base portion functioning as a base, a side where a turntable is disposed or a side from which a disk is installed is defined as an upward direction, whereas an opposite side as a downward direction.

Embodiment 1

Hereinafter, an embodiment of the invention will be described using respective drawings.

Figure 2:
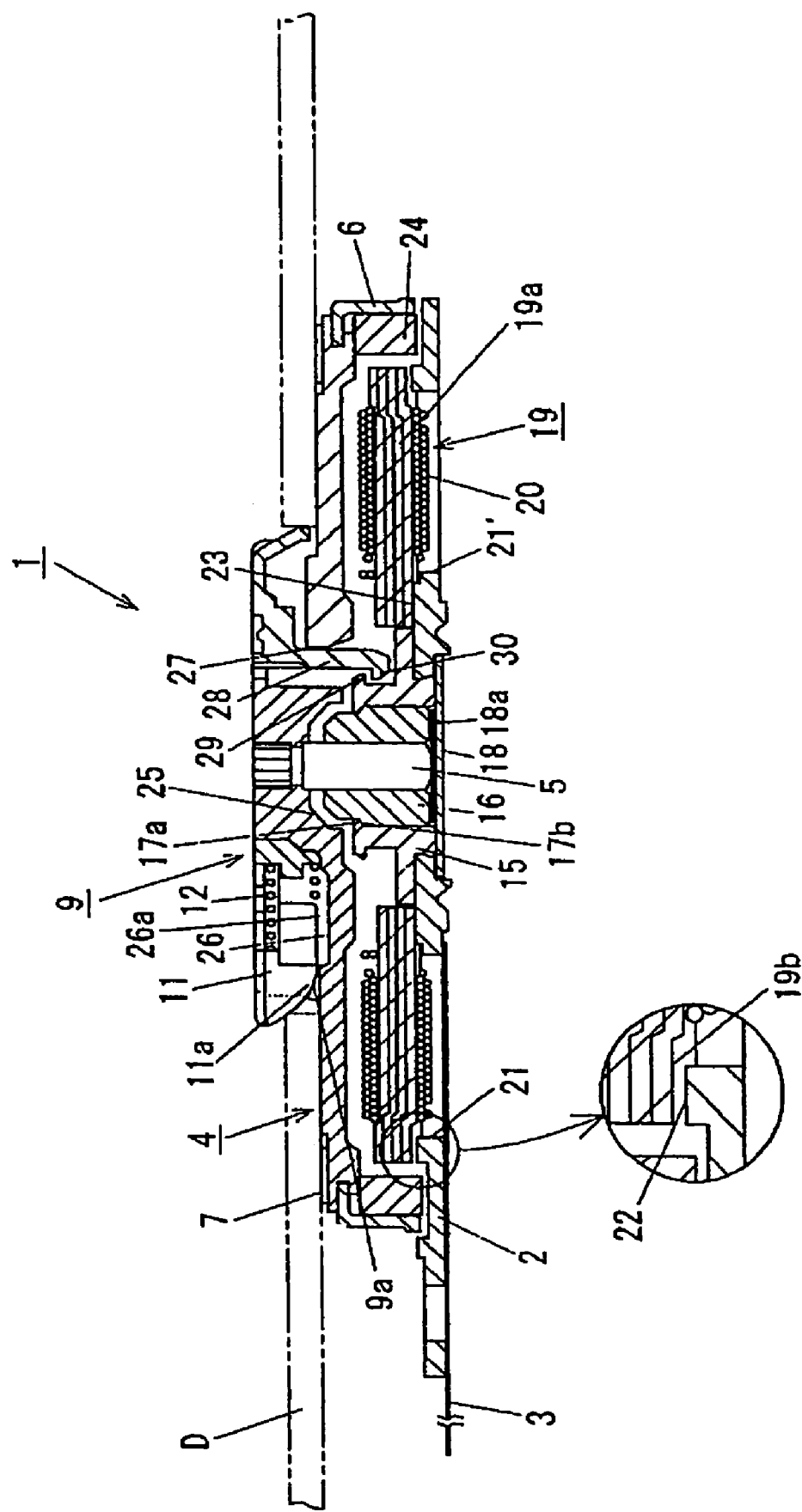
FIG. 2 is a sectional view taken along the line A-A in FIG. 1 and viewed in a direction indicated by arrows attached to the line.

FIG. 1 is a plan view of a disk drive according to Embodiment 1 of the invention, and FIG. 2 is a sectional view taken along the line A-A in FIG. 1 and viewed in a direction indicated by arrows attached to the line.

In the figures, reference numeral 1 denotes a disk drive according to Embodiment 1 of the invention, 2 a base portion, 2a a mounting raised portion via which the disk drive 1 is mounted in a housing where to house the disk drive 1, the mounting raised portion being provided in a plural number, 2b a mounting hole formed substantially at a central portion of the mounting raised portion 2a, 2c a mounting surface formed on an upper side of the mounting hole 2b, 3 a circuit board on which an electronic element for driving a motor is mounted, and which includes a circuit board for supplying an electricity to the electronic element and an exchanging an signal, provided to extend along a lower surface of the base portion 2 and to which lead wires of coils of a stator, which will be described later on, are connected, 4 a disk-shaped turntable, 5 a spindle fixed to a central portion of the turntable 4, 6 an annular yoke provided on an outer circumferential portion of the turntable 4, 7 a slip preventive material affixed to the vicinity of an outer circumferential portion of an upper surface of the turntable 4, 8 a holding portion fixing portion provided substantially at a central portion of the upper surface of the turntable 4 in such a manner as to protrude therefrom, 9 a disk holding portion provided at the central portion of the upper surface of the turntable 4 in such a manner as to be fitted in the holding portion fixing portion 8 so as to be fixed in place therein, 10 a sliding groove portion formed in such a manner as to extend from an outer circumferential portion of the disk holding portion 9 towards a central portion thereof, 11 a disk holding claw provided in such a manner as to move into and out of the sliding groove 10, 12 a spring portion provided in the sliding groove portion 10 so as to bias the disk holding claw 11 to protrude from the outer circumferential portion of the disk holding portion 9, and 13 a disk abutment portion provided on the outer circumferential portion of the disk holding portion 9.

In FIG. 2, reference numeral 15 denotes a cylindrical bearing holding portion provided substantially at a central portion on an upper surface of the base portion, 16 a bearing portion held in an inside of the bearing holding portion 15 in such a manner as to rotatably support the spindle 5, 17a a bearing portion 16 dislodgement preventive raised portion formed on a terminal end portion of the bearing holding portion 15 which lies to a side of the turntable 4 in such a manner as to extend inwardly, 18 a thrust plate fixed to a central opening of the base portion 2 and provided in such a manner as to oppositely face the bearing portion 16, 18a a thrust bearing sheet laid out on an upper surface of the thrust plate 18, 19 a stator provided in such a manner as to surround circumferentially the bearing holding portion 15, 19a a stator core which makes up the stator together with coils, which will be described later on, 19b a stepped portion formed on a lower surface of an outer circumferential portion of each tee of the stator core 19a, 20 a coil wound around the tee of the stator core 19a, 21, 21' a plurality of openings formed in the base portion 2 which lies below the coils 20 of the stator 19 in such a manner as to correspond to the coils 20, 22 a raised base portion formed on a circumferential portion on an outer circumferential side of the openings 21, 21' on the upper side of the base portion 2 in such a manner as to oppositely face the stepped portion 19b formed on the outer circumferential portion of the stator core 19a, 23 an inner circumferential portion support portion formed on a circumferential portion on an inner circumferential side of the openings 21, 21' on the upper side of the base portion, 24 an annular magnet provided on an inner side of the yoke 6 in such a manner as to oppositely face distal end portions of the tees of the stator core 19a which lie on an outer circumferential side of the tees, 25 a recessed portion provided on a circumferential portion of the spindle 5 fixed to a center of a surface of the turntable 4 which oppositely faces the base portion 2 in such a manner as to follow external shapes of the bearing holding portion 15 and the bearing portion 16, 26 an oscillation relief groove portion formed on the upper surface of the turntable 4 in such a manner as to be positioned below the disk holding claw 11, 27 a plurality of through holes formed in such a manner as to surround circumferentially the spindle 5 fixed to the turntable 4, 28 a plurality of dislodgement preventive portions provided in such a manner as to extend from a lower surface of the disk holding portion 9 towards the base portion 2 after passing through the respective through holes 27, 29 a hook locking portion formed on an outer circumferential wall of an upper end portion of the bearing holding portion 15, and 30 a hook portion formed at a distal end portion of the dislodgement preventive portion which lies to a side of the base portion 2 in such a manner as to be brought into engagement with the hook locking portion 29.

Note that in FIG. 2, while the stator core 19a is drawn as a flat plane, in the actual disk drive 1, in consideration of the effect of warping caused by dies and a press which are used to produce the stator core 19a, the stepped portion 19b is set to an appropriate step dimension.

Here, the turntable 4 is formed from a synthetic resin such as PPS (polyphenylene sulfide) and PC (polycarbonate) and is molded integrally with the spindle 5 and the yoke 6 through insert molding, and the annular magnet 24, which is centered at the spindle 5, is fitted in the yoke 6 so as to be fixed in place therein. The magnet 24 is provided to be spaced apart from the outer circumferential portion of the stator 19 at a predetermined interval in such a manner as to oppositely face the stator 19.

In addition, the recessed portion 25 is formed on the circumferential portion of the spindle 5 fixed at the center of the lower surface of the turntable 4 which oppositely faces the base portion in such a manner as to follow the external shapes of the bearing holding portion 15 and the bearing portion 16. Note that since the turntable 4 is formed from the synthetic resin, the recessed portion 25 can easily be formed at the time of insert molding.

A slid surface 9a is provided on the disk holding portion 9 at a position oppositely facing a distal lower end surface 11a of the disk holding claw 11 in such a manner as to be inclined radially inwardly, and the oscillation relief groove 26 is formed on the upper side of the turntable 4 at a position which oppositely faces a lower portion of the disk holding claw 11 in such a manner as to maintain a predetermined gap 26a.

This oscillation relief groove 26 is partially provided on the upper surface side of the turntable 4, and since even in the event that the portion where the oscillation relief groove 26 is provided is made thin, the strength can be secured as a whole, the overall height-ways dimension does not have to be increased in order to secure the predetermined gap 26a.

In addition, the disk holding portion 9 is formed substantially in the same size of a center hole of a disk D, and the disk D is fixed to the disk holding portion 9 when the disk holding portion 9 is fitted in the center hole, whereby the disk D placed on the turntable 4 is installed on the disk holding portion 9.

As this occurs, the disk holding claw 11 slides radially inwardly along the inclination of the slide surface 9a, and thereafter, when it comes into abutment with an upper surface of the slip preventive material 7, the disk holding claw 11 is biased by the spring portion 12 so as to protrude, whereby the center hole of the disk D is locked.

The bearing holding portion 15 is formed from the synthetic resin such as PPS (polyphenylene sulfide) and PC (polycarbonate) and the dislodgement preventive raised portion 17a is formed on an inner circumferential portion of an upper end of the bearing portion holding portion in such a manner as to prevent an upward movement of the bearing portion 16. In addition, the thrust plate 18 is provided in a lower opening of the bearing holding portion 15 in such a manner as to prevent a downward movement of the bearing portion 16.

In addition, the stepped portion 19b of the stator core 19a and the raised base portion 22 of the base portion 2 are spaced apart from each other at a predetermined interval, whereby in the event that a large magnitude of load is applied to the base portion 2 as when the disk D is installed on the disk holding portion 9, the base portion 2 is deformed, and the stepped portion 19b of the stator core 19a is brought into abutment with the raised base portion 22, whereby deformation stress is dispersed not only to a central portion of the base portion 2 but also to a peripheral portion thereof. Note that since the stepped portion 19b is formed on the lower surface of the outer circumferential portion of the stator core 19a, the raised base portion 22, which is spaced apart from the base portion 2 at a predetermined interval, can easily be formed. In addition, an interval formed between the stepped portion 19b of the stator core 19a and an upper surface of the raised base portion 22 is in the range of on the order of 0.1 mm to 0.2 mm depending on the thickness of the base portion 2 and the outside diameter of the disk drive 1.

Next, the base portion 2 will be described in detail using FIGS. 3 and 4.

Figure 3:
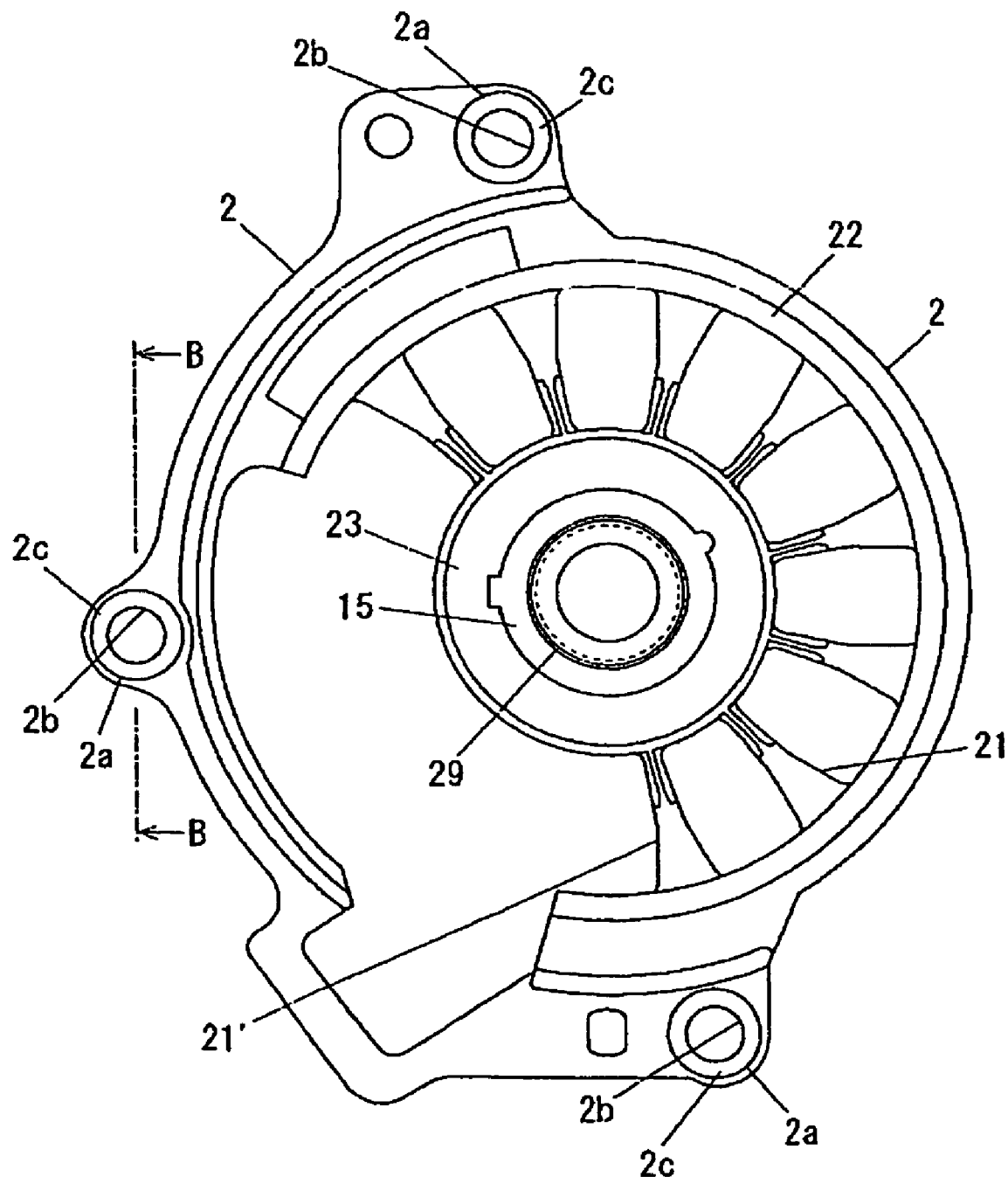
FIG. 3 is a plan view of a main part of a base portion.
Figure 4:
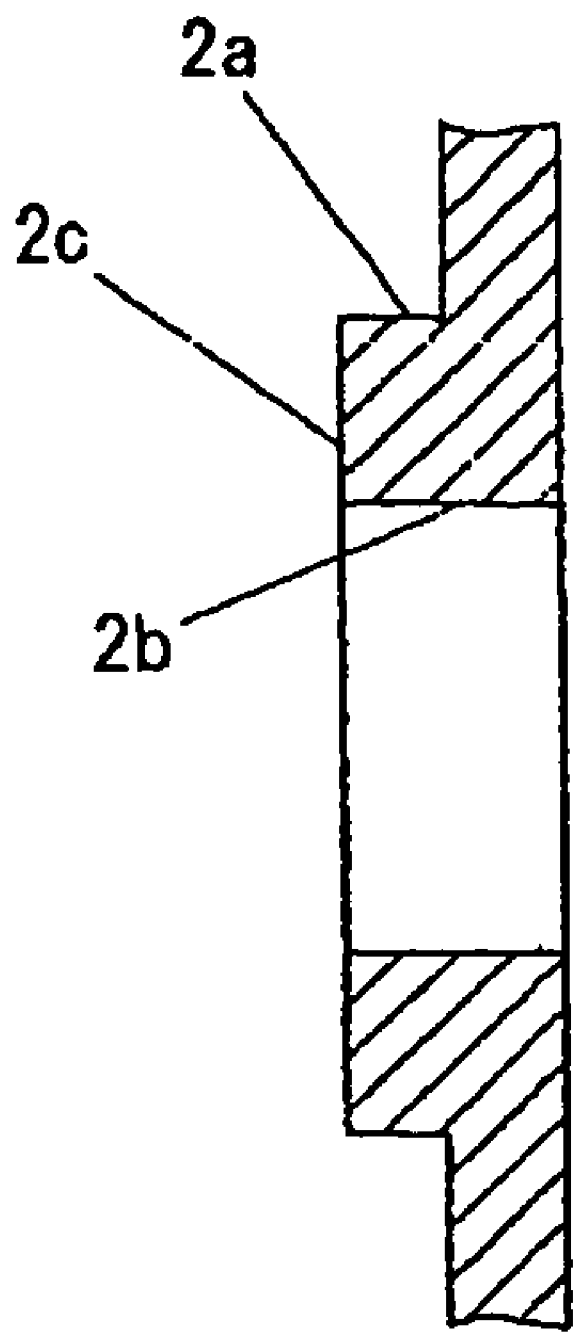
FIG. 4 is a sectional view taken along the line B-B in FIG. 3 and viewed in a direction indicated by arrows attached to the line.

FIG. 3 is a plan view showing a main part of the base portion, and FIG. 4 is a sectional view taken along the line B-B in FIG. 3 and viewed in a direction indicated by arrows attached to the line.

The base portion 2 is formed by punching the openings 21, 21' out of a sheet of aluminum or the like and forging the raised base portion which protrudes by a predetermined height from the upper surface of the base portion 2, the inner circumferential portion support portion 23, and the mounting raised portions 2a, the mounting holes 2b and the mounting surfaces 2c. Since the coils 20 shown in FIG. 2 are partially inserted into the openings 21, 21' which are punched out, the stator 19 can be provided at a lower position.

In addition, as shown in FIG. 3, the opening 21' is formed larger than the opening 21, and a plurality of corresponding coils 20 are inserted in the opening 21'. In addition, a main part of the circuit board 3 (refer to FIG. 1) made from FPC is provided below the opening 21'. As this occurs, the circuit board 3 is provided in such a manner that land portions (not shown) thereof are positioned between tees of the stator 19, whereby soldering work in which windings of the coils 20 are soldered to the land portions is designed to be implemented with ease from above the opening 21'.

In addition, the plurality of mounting raised portions 2a are provided on the outer circumferential portion of the base portion 2, and as shown in FIG. 4, which is the sectional view taken along the line B-B in FIG. 3 and viewed in the direction indicated by the arrows attached to the line, since the mounting raised portions 2a are formed in such a manner as to protrude by the predetermined height from the upper surface of the base portion 2, the mounting raised portions 2a so formed function as spacers that is interposed between a housing (not shown) of a system which is designed to house the disk drive 1 and the base portion 2, and the housing (not shown) of the system can be mounted on the mounting surfaces 2c with a predetermined space secured therebetween without using those spacers, the housing (not shown) being thereafter securely screwed to be fixed onto the base portion 2 via the mounting holes 2b.

Next, a mounting construction of the disk holding portion 9 on to the turntable 4 will be described in detail using FIGS. 5 and 6.

Figure 5:
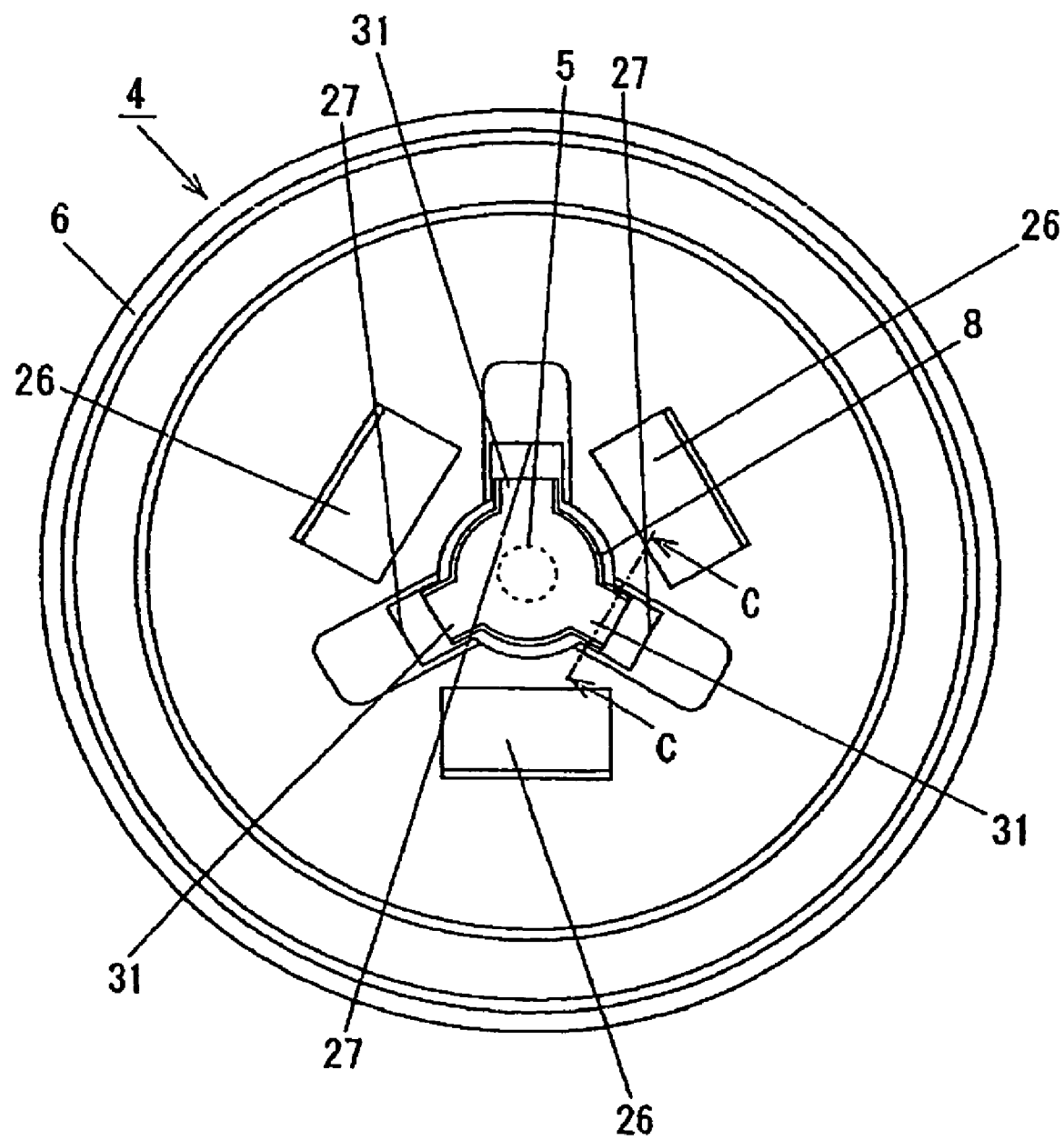
FIG. 5 is a plan view of a main part of a turntable.
Figure 6:
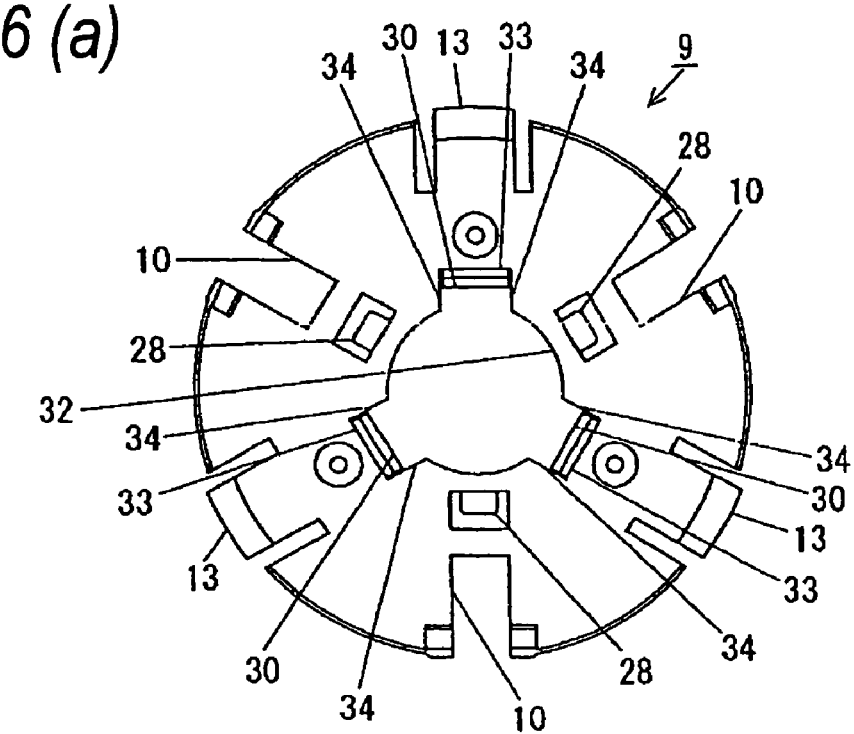
FIG. 6(a) is a plan view of a main part of a disk holding portion, (b) is a side view of the main part of the disk holding portion, and (c) is a sectional view taken along the line C-C in FIG. 5 and viewed in a direction indicated by arrows attached to the line.
Figure 6:
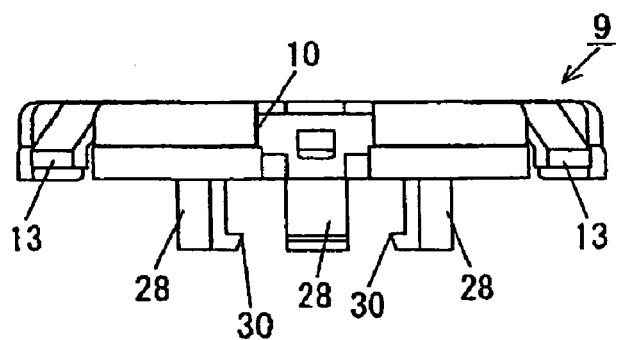
Figure 6:
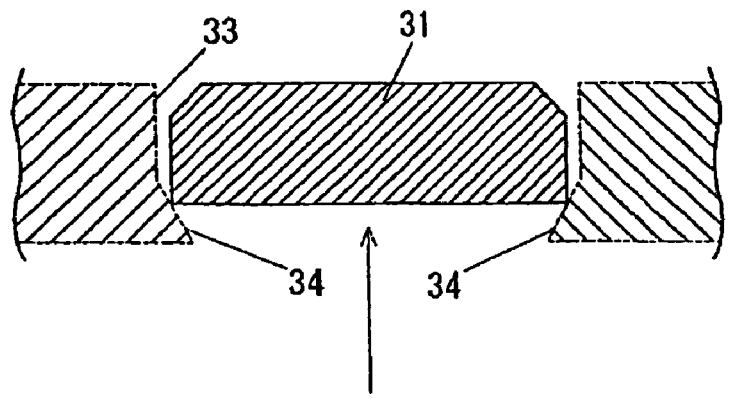

FIG. 5 is a plan view showing a main part of the turntable, and FIG. 6(a) is a plan view showing a main part of the disk holding portion, FIG. 6(b) is a side view showing the main part of the disk holding portion, and FIG. 6(c) is a sectional view taken along the line C-C in FIG. 5 and viewed in a direction indicated by arrows attached to the line, which shows a state in which a protruding portion, which will be described later on, is fitted in a fitting portion, which will be described later on. Note that in FIG. 6, the disk holding claws 11 and the spring portions 12 are omitted for the sake of easing the understanding of a description to be made as below.

In the figures, reference numeral 31 denotes a protruding portion formed on an outer circumferential portion of the holding portion fixing portion 8, 32 a fixing hole portion which is formed substantially at a central portion of the disk holding portion 9 and through which the holding portion fixing portion 8 is passed, 33 a recess-shaped fitting portion which is formed on an inner circumferential wall of the fixing hole portion 32 and in which the protruding portion 31 is fitted, 34 a locking raised portion which is formed on an inner wall of the fitting portion 33 in such a manner as to be locked on the protruding portion 31.

To mount the disk holding portion 9 on the turn table 4, firstly, the dislodgement preventive portions 28 of the disk holding portion 9 are passed through the respective through holes 27 in the turntable 4, and the fixing hole portion 32 is fitted on the holding portion fixing portion 8. As this occurs, as shown in FIG. 6(c), the protruding portions 31 formed on the outer circumferential portion of the holding portion fixing portion 8 are inserted, respectively, in the fitting holes 33 formed on the outer circumferential portion of the fixing hole portion 32 from a direction indicated by an arrow, whereby both side portions of the protruding portion 31 are locked at the locking raised portion 34 on the inner wall of the fitting portion, whereby the disk holding portion 9 is fixed to the turntable 4, and the dislodgement preventive portions 28 pass, respectively, through the through holes 27 to thereby protrude from the lower surface of the turntable 4.

Thus, since the disk drive 1 according to Embodiment 1 of the invention is configured as has been described heretofore, the following functions are provided.

(1) Since the turntable 4 is formed from the synthetic resin material, the weight reduction becomes possible, and since the recessed portion 25 can easily be formed on the circumferential portion of the spindle 5 fixed to the center of the lower surface of the turntable 4 in such a manner as to follow the external shapes of the bearing portion 16 and the bearing holding portion 15 and the oscillation relief grooves 26 and the like can also easily be formed on the upper surface thereof, the generation of unnecessary spaces above and below the turntable can be prevented, thereby making it possible to thin the disk drive 1 as a whole.

(2) Since the dislodgement portions 28 extend from the lower surface of the disk holding portion 9 towards the base portion 2 in such a manner as to pass through the through holes 27 to thereby protrude from the lower surface of the turntable 4, even in the event that the whole disk drive 1 is thinned, the dislodgement preventive portions 28 can be formed in such a manner as to have a sufficient length so as to obtain a sufficient flexibility with which the hook portions 30 formed at the distal end portions thereof which lies to a side of the base portion 2 are locked on the hook locking portion 29, whereby the turntable 4 can easily be mounted to the side of the base portion and can be prevented from being dislodgement therefrom in an ensured fashion.

(3) The disk holding portion 9 can be fixed to the turntable 4 only by fitting the fixing hole portion 32 on the holding portion fixing portion 8, whereby the mounting work can be eased and the mounting can be implemented with a high position accuracy, and the disk holding portion 9 can be fitted in the holding portion fixing portion 8 so as to be fixed in place therein by locking the protruding portions 31 on the locking raised portions 34 formed on the inner walls of the fitting portions 33 without using an adhesive material or the like, whereby the mounting work can be eased and the number of manhours required to carry out the work can be reduced, thereby making it possible to provide a superior productivity.

(4) Since the openings 21 are formed in the base portion 2, the stator 19 can be provided at the lower position bypassing the coils 20 through the openings 21, thereby making it possible to thin the disk drive 1 as a whole.

(5) Since the stepped portion 19b of the stator core 19a and the raised base portion 22 of the base portion are spaced apart from each other at the predetermined interval, the magnetic circuit at the outer circumferential portion of the stator core 19a can be stabilized, thereby making it possible to increase the efficiency.

(6) In the event that a large magnitude of load is applied to the base portion 2 as when the disk D is installed thereon, since the base portion 2 is deformed such that the stepped portion 19b of the stator core 19a is brought into abutment with the raised base portion 22, whereby deformation stress is dispersed not only to the central portion of the base portion 2 but also to the peripheral portion of the base portion 2, the mechanical strength can be maintained.

(7) Even in the event that the base portion 2 is thinned as a whole, the mechanical strength of the base portion 2 can be increased by providing the raised base portion 22 whose thickness is increased locally.

(8) Since the circuit board 3 is provided on the lower surface of the base portion 2, there is no need to insert the circuit board 3 or form a gap for the circuit board 3 between the turntable 4 and the base portion 2 as in the case with the conventional techniques, whereby the height from the mounting surface 2c provided on the upper surface of the base portion which constitutes the mounting surface to the housing where the disk drive is housed to the upper surface of the disk holding portion 9 can be suppressed to a lower level, and hence, the reduction in the thickness of the entirety of the system in which the disk drive 1 is actually installed can be realized.

(9) Since the heat of a soldering bit is dissipated via the base portion 2 in no case during soldering work, the working efficiency at the time of soldering can be increased.

(10) Since the mounting raised portions 2a are formed on the base portion 2, there is no need to use separate spacers as in the case with the conventional techniques, whereby the mounting error can be reduced, and since the mounting raised portion 2a is molded through pressing using dies, the height of the mounting raised portion 2a can be adjusted easily by selecting dies.

(11) Since the vertical movements of the bearing portion 16 can be prevented by virtue of the engagement between the dislodgement preventive raised portion 17a and the dislodgement preventive locking portion 17b and by means of the thrust plate 18, even in the event that the bearing holding portion 15 is formed from the synthetic resin, the bearing portion 16 can be fixedly held by the bearing holding portion 15 in the ensured fashion.

Embodiment 2

FIG. 7(a) is a sectional view which shows a main part of a disk drive according to Embodiment 2 of the invention, and FIG. 7(b) is an enlarged sectional view which shows a main part of a bearing portion.

In FIGS. 7(a), 7(b), reference numeral 1a denotes a disk drive according to Embodiment 2, 2 a base portion, 4 a turntable, 5 a spindle, 6 a yoke, 9 a disk holding portion, 15 a bearing holding portion, 16 a bearing portion, 18 a thrust plate, 18a a thrust bearing sheet, 19 a stator, 24 a magnet, and D a disk, and like reference numerals are imparted to constituent components including these which are like to those described with reference to Embodiment 1, and the description thereof will be omitted.

Here, reference numeral 35 denotes an annular spindle attracting magnet which is provided on a side of the bearing portion 16 which lies to a side of the base portion 2 in such a manner as to surround circumferentially a distal end portion of the spindle 5 which lies to the side of the base portion 2, and reference character M denotes a magnetic flux generated by the spindle attracting magnet 35.

As shown in FIG. 7(b), a magnetic flux M is generated from the spindle attracting magnet 35 which passes through the spindle 5 made of a magnetic material via the bearing portion made of a magnetic material and also passes through the trust plate 18 which is made of a magnetic material similarly, and the magnetic flux so generated forms a magnetic circuit which attracts the spindle 5 towards the side of the base portion 2, and the turntable 4 is attracted to a side of the thrust plate 18 (the side of the base portion 2) via the spindle 5.

Thus, since the disk drive 1a according to Embodiment 2 is configured as has been described above, in addition to the functions provided by Embodiment 1, since there is generated little rotating magnetic field and since there is nothing that is affected by the gap variation and nonalignment of gaps between the turntable 4 and the annular magnet, which are the problems inherent in the conventional techniques, a loss attributed to the variation in magnetic field and deterioration by noise can be reduced, and since no space where to provide the magnet is necessary between the turntable 4 and the stator 19, the disk drive can be thinned.

Embodiment 3

Figure 8:
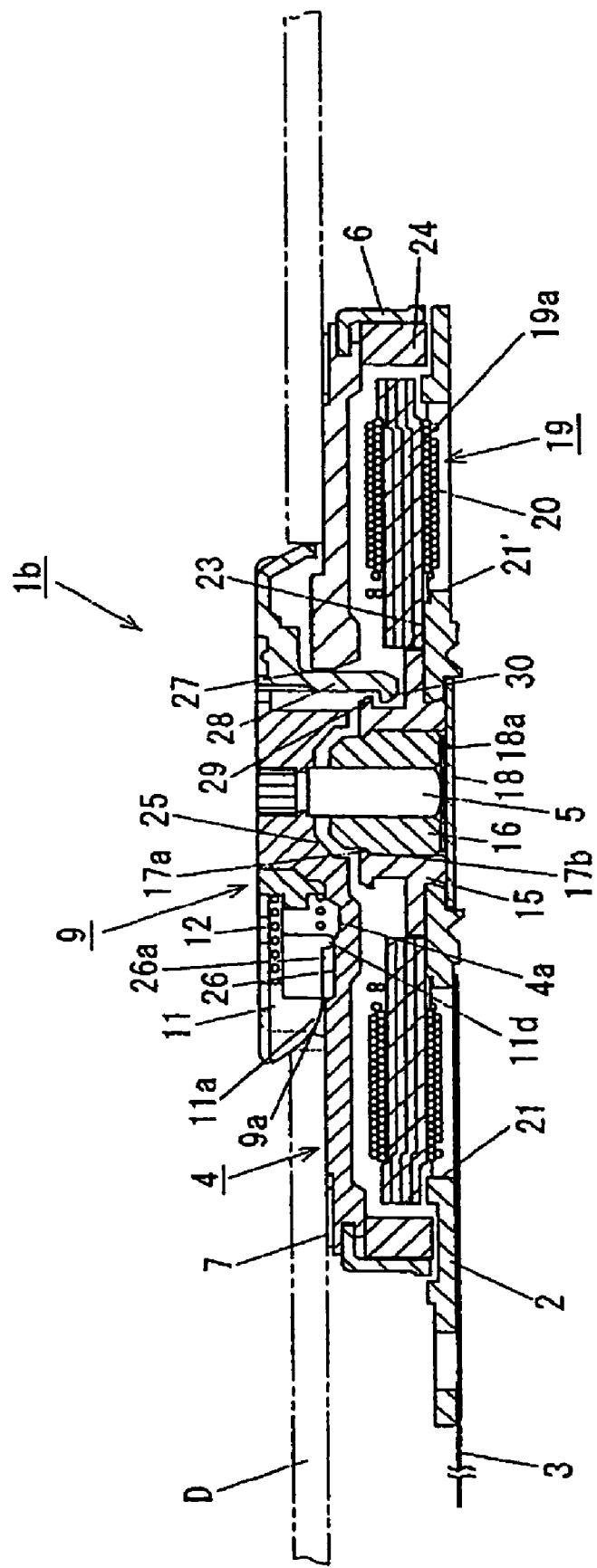
FIG. 8 is a sectional view of a main part of a disk drive according to Embodiment 3.

FIG. 8 is a sectional view which shows a main part of a disk drive according to Embodiment 3 of the invention.

In FIG. 8, reference numeral 1b denotes a disk drive according to Embodiment 3, 4 a turntable, 7 a slip preventive material, 9 a disk holding portion, 11 a disk holding claw, 12 a spring portion, and reference character D denotes a disk, and like reference numerals are imparted to constituent components including these which are like to those described with reference to Embodiment 1, and the description thereof will be omitted.

In addition, since the configuration of the disk holding portion 9 is similar to what is shown in FIG. 1 which is described with reference to Embodiment 1, the same figure will also be used in the following description.

Here, the disk holding portion 9 includes a plurality of sliding groove portions 10 formed thereon in such a manner as to extend from an outer circumferential portion to a central portion thereof, disk holding claws 11 provided in such a manner as to freely move, respectively, into and out of the sliding groove portions 10, and spring portions 12 provided, respectively, in the sliding groove portions 10 so as to bias the disk holding claws 11 in such a manner as to protrude from an outer circumferential portion of the disk holding portion 9. In addition, oscillation relief grooves 26 are formed, respectively, at positions below the disk holding claws 11 in such a manner as to substantially oppositely face the disk holding claws 11 on an upper surface of the turntable 4, tilting restricting raised portions 11d are provided, respectively, on inner sides of radially lower portions of the disk holding claws, and accommodating recessed portions 4a are formed, respectively, in the oscillation relief grooves 26 in such a manner as to accommodate therein the tilting restricting raised portions 11d in such a state that the disk holding claws 11 are slid inwards to a maximum extent when the disk D is installed.

Figure 9:
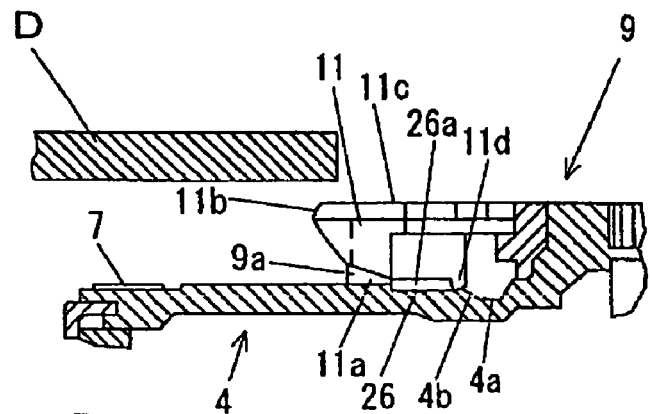
FIG. 9(a) is a sectional view of a main part of Embodiment 3 before the installation of a disk, (b) is a sectional view of the main part of Embodiment 3 at an initial stage of the installation of the disk, (c) is a sectional view of the main part of Embodiment 3 at a middle stage of the installation of the disk, (d) is a sectional view of the main part of Embodiment 3 after the installation of the disk, and (e) is a sectional view of a main part of Embodiment 1 after the installation of the disk.
Figure 9:
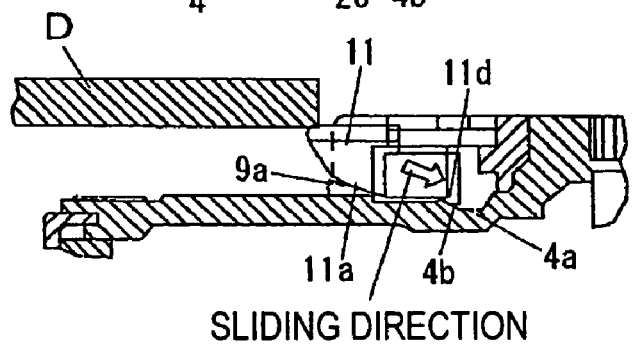
Figure 9:
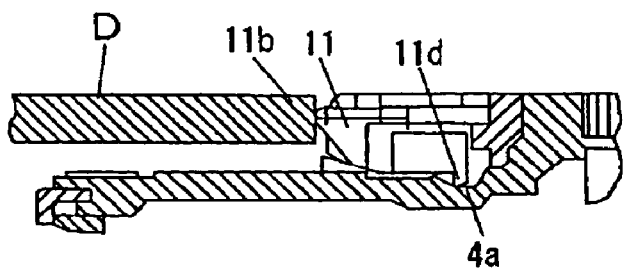
Figure 9:
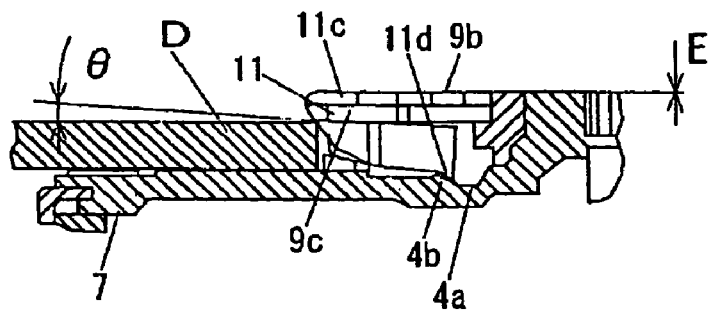
Figure 9:
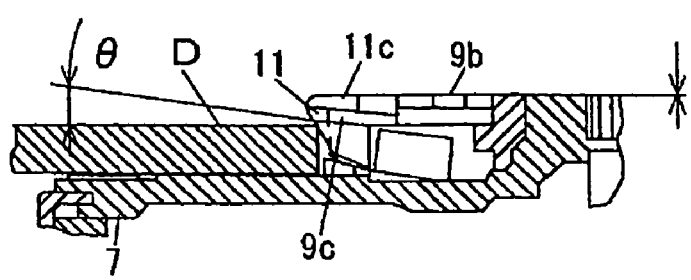

The function of Embodiment 3 that is configured as has been described above will be described using FIG. 9 while comparing to that of Embodiment 1.

FIG. 9(a) is a sectional view which shows a main part of Embodiment 3 before the disk is installed, FIG. 9(b). is a sectional view which shows the main part of Embodiment 3 at an initial stage of the installation of the disk, FIG. 9(c) is a sectional view which shows the main part of Embodiment 3 at a middle stage of the installation of the disk, FIG. 9(d) is a sectional view which shows the main part of Embodiment 3 after the disk has been installed, and FIG. 9(e) is a sectional view which shows the main part of Embodiment 1 after the disk has been installed, and with a view to easing the description, the spring portions 12 are omitted in those figures.

Firstly, as shown in FIG. 9(a), reference numeral 11c denotes an upper surface portion of a disk holding claw 11, 11b a radially outside distal end portion of the disk holding claw 11, 11d a tilting restricting raised portion which is provided on an inner side of a radially lower portion of the disk holding claw 11, and a slide surface 9a is provided on the disk holding portion 9 at a position which oppositely faces a distal end lower surface portion 11a of the disk holding claw 11 in such a manner as to be inclined radially inwardly.

In addition, an accommodating recessed portion 4a is formed on an upper surface of the turntable 4, and the accommodating recessed portion 4a has an auxiliary slide surface 4b on a radially outer side thereof.

Next, as shown in FIG. 9(b), the disk holding claw 11 slides radially inwardly along the inclination of the slide surface 9a.

As this occurs, a radially outside ridge line of the tilting restricting raised portion is in such a state that there is provided a slight gap relative to the auxiliary slide surface 4b or the ridge line is in a slight contact with the relevant slide surface.

Then, as shown in FIG. 9(c), when there is produced a state in which an inner circumferential wall of a center hole of the disk D and the radially outside distal end portion 11b of the disk holding claw 11 coincide with each other, the disk holding slide 11 slides to a maximum extent or the slide amount thereof becomes maximum, resulting in a state in which the tilting restricting raised portion 11d is accommodated within the accommodating recessed portion 4a.

Finally, as shown in FIG. 9(d), the disk D comes into abutment with an upper surface of the slip preventive material 7, and the disk holding claw 11 is biased by the spring portion 12 (not shown) to thereby protrude, whereby the center hole of the disk D is locked. However, as this occurs, the disk holding claw 11 tilts about a fulcrum 9c, and the radially outside ridge line of the tilting restricting raised portion 11d is in such a state as to be in abutment with a further outside position of the auxiliary side surface 4b.

When comparing to the sectional view shown in FIG. 9(e) which shows the main part of Embodiment 1, as a comparison example, which results after the disk has been installed, a tilting angle θ of Embodiment 3 can be made smaller than a tilting angle θ of Embodiment 1 which is shown in FIG. 9(e) as the comparison example, by setting appropriately the shape and size of the tilting restricting raised portion 11d because the tilting restricting raised portion 11d restricts the tilting of the disk holding claw 11.

Namely, the protruding amount E of the disk holding claw shown in FIG. 9(d) from an upper surface 9b of the disk holding portion 9 can be made smaller than what is shown in FIG. 9(e), thereby making it possible to thin the disk drive.

As has been described above, in addition to the functions provided by Embodiment 1, the disk drive 1b according to Embodiment 3 has the function to make the disk drive much thinner since the protruding amount E of the disk holding claw 11 from the upper surface 9b of the disk holding portion 9 can be suppressed to a lower level.

Embodiment 4

Figure 10:
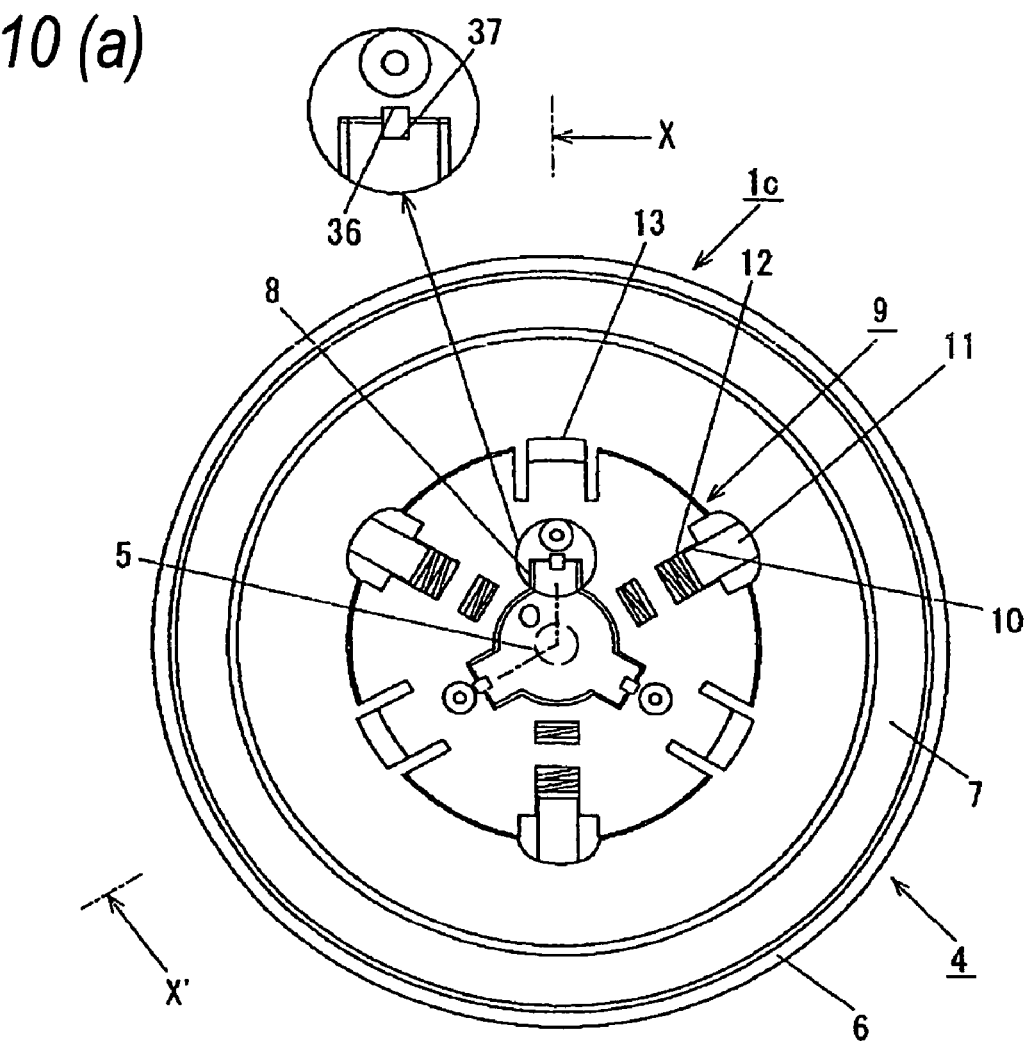
FIG. 10(a) is a plan view of an upper side of a turntable according to Embodiment 4, and (b) is a sectional view taken along the line X-O-X' in the same figure (a) and viewed in a direction indicated by arrows attached to the line.
Figure 10:
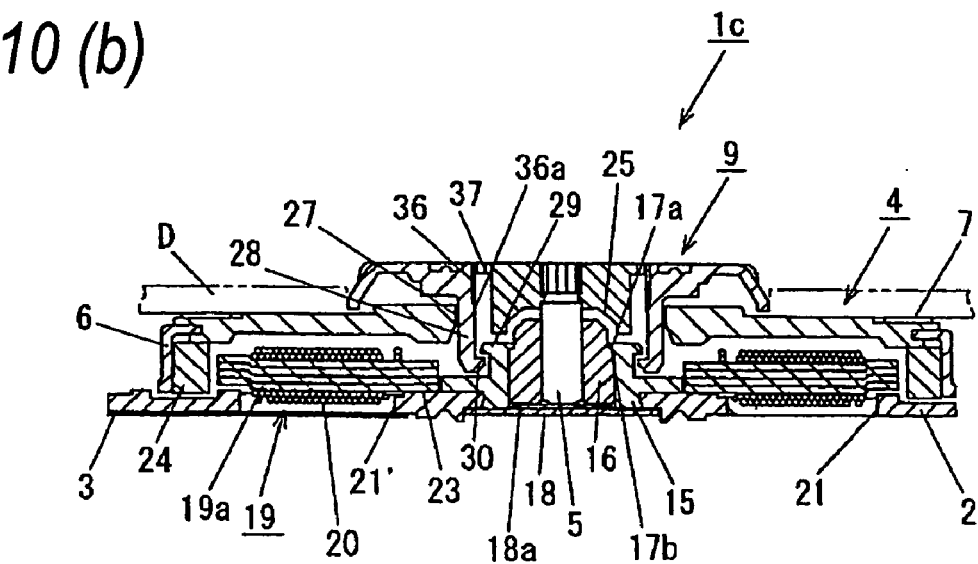

FIG. 10(a) is a plan view of an upper side of a turntable according to Embodiment 4, and FIG. 10(b) is a sectional view taken along the line X-O-X' in the same figure and viewed in a direction indicated by arrows attached to the line.

As shown in FIGS. 10(a), 10(b), reference numeral 1c denotes a disk drive according to Embodiment 4, 4 a turntable, 5 a spindle, 6 a yoke, 7 a slip preventive material, 8 a holding portion fixing portion, 9 a disk holding portion, and 11 a disk holding claw, and like reference numerals are imparted to constituent components including these which are like to those described with reference to Embodiment 1, and the description thereof will be omitted.

As shown in FIG. 10(a), disassembling grooves 36 are provided on radially inward sides of dislodgement preventing portions 28 in such a manner as to extend from a surface of the disk holding portion onto which a disk is installed towards a base portion 2, the surface constituting an upper surface of the disk holding portion 9, gradient surfaces 36a are provided at terminal end portions of the disassembling grooves 36 in the extending direction in such a manner as to be inclined radially inwardly, and furthermore, disassembling auxiliary groove portions 37 are provided in such a manner as to oppositely face the disassembling groove portions 36, respectively, and to extend from a surface which lies on a side from which the disk D is installed, that is a surface constituting an upper surface of the holding portion fixing portion 8 provided substantially at a central portion of the turntable 4 in such a manner as to protrude therefrom so as to fix the disk holding portion 9 towards the base portion 2.

Next, as shown in FIG. 10(b), a radially inwardly inclined gradient surface 36a is provided on a terminal end portion of the disassembling groove portion 36 in the direction in which the relevant groove portion extends.

On the other hand, reference numeral 37 denotes a disassembling auxiliary groove portion which is provided in such a manner as to oppositely face the disassembling groove portion 36 and to extend from the surface which lies on the side from which the disk D is installed, that is, the surface constituting the upper surface of the holding portion fixing portion 8 provided substantially at the central portion of the turntable 4 in such a manner as to protrude therefrom so as to fix the disk holding portion 9 towards the base portion, which is a downward direction, the disassembling auxiliary groove portion 37 being provided in such a state that it penetrates through the holding portion fixing portion 8.

A state will be described using FIGS. 11(a) to 11(c) in which the disk drive according to Embodiment 4 is disassembled.

Figure 11:
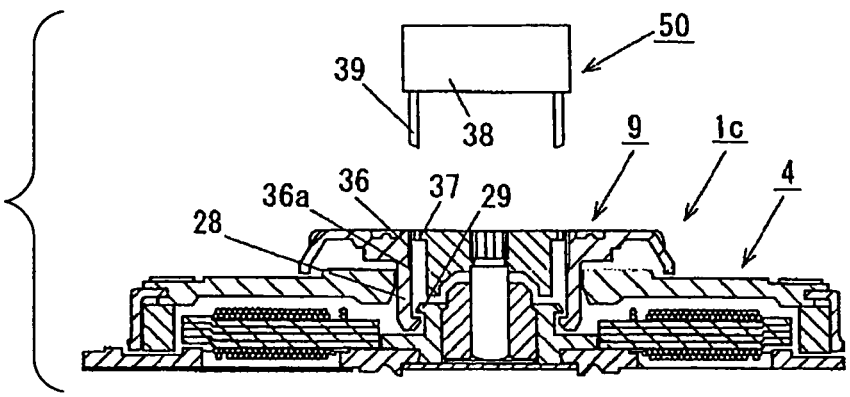
FIG. 11(a) is a sectional view of a main part of Embodiment 4 before a disassembling jig is inserted, (b) is a sectional view of the main part of Embodiment 4 after the disassembling jig has been inserted, and (c) is a sectional view of the main part of Embodiment 4 after the disk drive has been disassembled.
Figure 11:
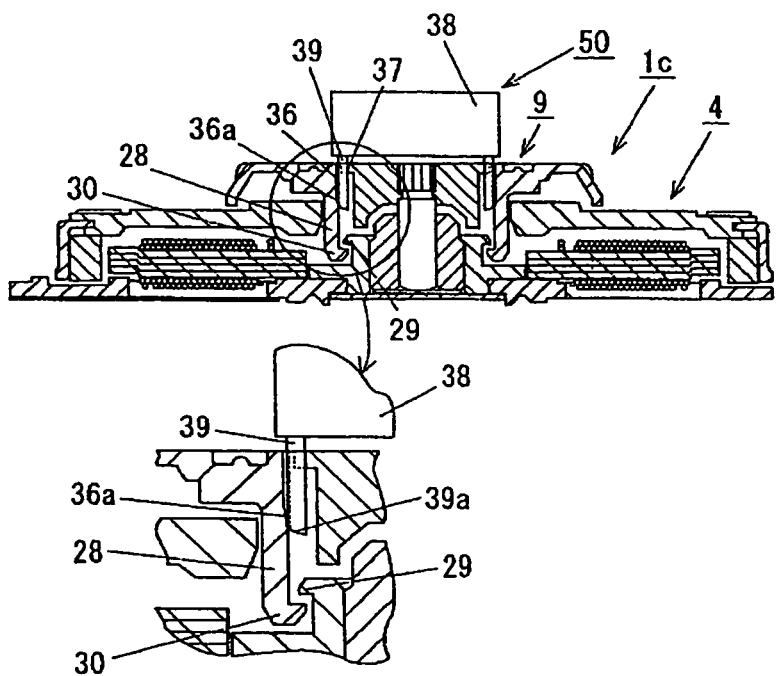
Figure 11:
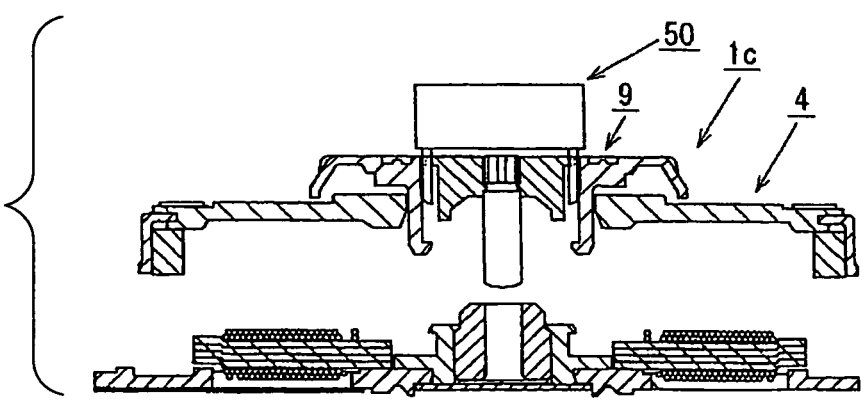

FIG. 11(a) is a sectional view which shows a main part of the disk drive according to Embodiment 4 before a disassembling jig is inserted, FIG. 11(b) is a sectional view which shows the main part of the disk drive according to of Embodiment 4 after the disassembling jig has been inserted, and FIG. 11(c) is a sectional view which shows the main part of the disk drive according to of Embodiment 4 after the disk drive has been disassembled.

Firstly, as shown in FIG. 11(a), a disassembling jig 50 is made up of a jig base 38 and a plurality of jig claws 39 which corresponds to holes formed by pairs of disassembling groove portions 36 and disassembling auxiliary groove portions 37 of the disk drive 1c and which are provided at positions where the jig claws 39 can be fittingly inserted into the respective holes in such a manner as to protrude therefrom.

Next, as shown in FIG. 11(b), when the disassembling jig 50 is fittingly inserted from an upper surface of the disk holding portion 9 of the disk drive 1c, since there is provided no big gap between the holes formed by the pairs of disassembling groove portions 36 and disassembling auxiliary groove portions 37 and the jig claws 39 of the disassembling jig 50 in such a state that the jig claws 39 of the disassembling jig 50 are fittingly inserted into the corresponding holes, distal end R portions 39a of the jig claws 39 are brought into contact with the gradient surfaces 36a provided on the terminal portions of the disassembling groove portions 36 in the extending direction thereof in such a manner as to be inclined radially inwardly, whereby the dislodgement preventive portions 28 are pressed radially outside to thereby be put in a state in which the dislodgement preventive portions 28 are press opened.

In this state, since the hook portions 30 are disengaged from the hook locking portion 29, when both the disassembling jig 50 and the turntable 4 are pulled upwardly, the disk drive 1c can easily be disassembled.

Figure 12:
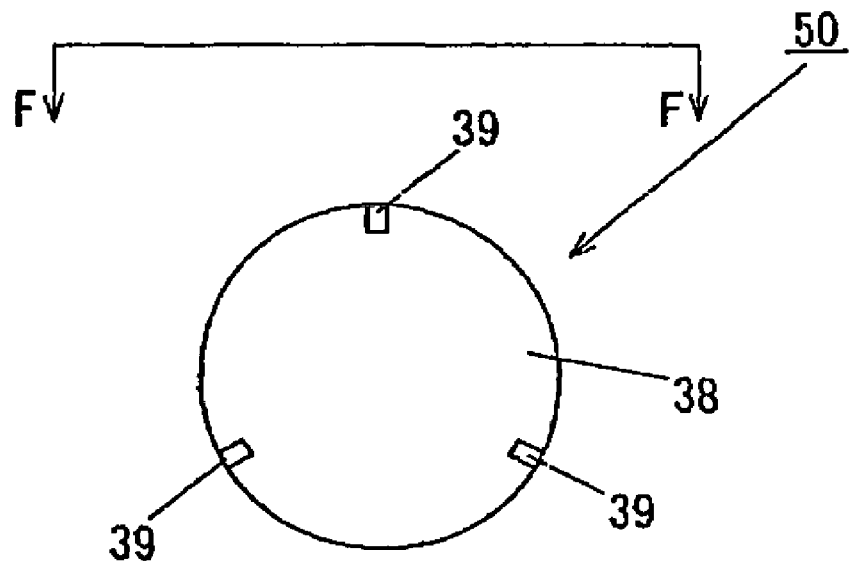
FIG. 12(a) is a plan view of a lower portion of the disassembling jig for use for the disk drive of Embodiment 4, and (b) is a sectional view taken along the line F-F in the same figure (a).
Figure 12:
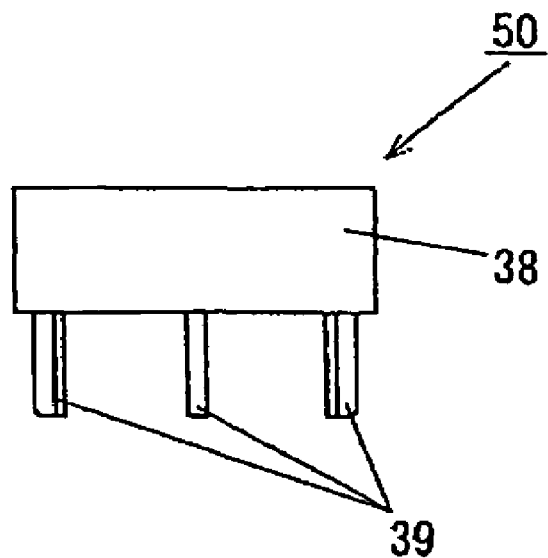

In addition, FIG. 12(a) is a plan view of a lower portion of the disassembling jig for use for the disk drive of Embodiment 4, and FIG. 12(b) is a sectional view taken along the line F-F in the same FIG. 12(a), and under the positional relationship shown in FIG. 11(a), jig claws 39 are configured so as to be provided at three locations on a circumferential portion of the disassembling jig 50 in such a manner as to oppositely face holes formed by pairs of disassembling groove portions 36 and disassembling auxiliary groove portions 37 and are made to be fittingly inserted thereinto with ease.

As has been described above, in the disk drive 1c according to Embodiment 4, by allowing the disassembling jig 50 to pass through the disassembling groove portions 36 provided in such a manner as to extend from the upper surface of the disk holding portion 9 towards the base portion 2, whereby the jig claws 39 of the disassembling jig 50 directly press the dislodgment preventive portions 28 radially outwardly so as to press open the dislodgement preventive portions 28, the hook portions 30 are disengaged so that the disk holding portion 9 can be removed, the disassembly of the disk drive 1c being thereby implemented with ease.

Embodiment 5

Figure 13:
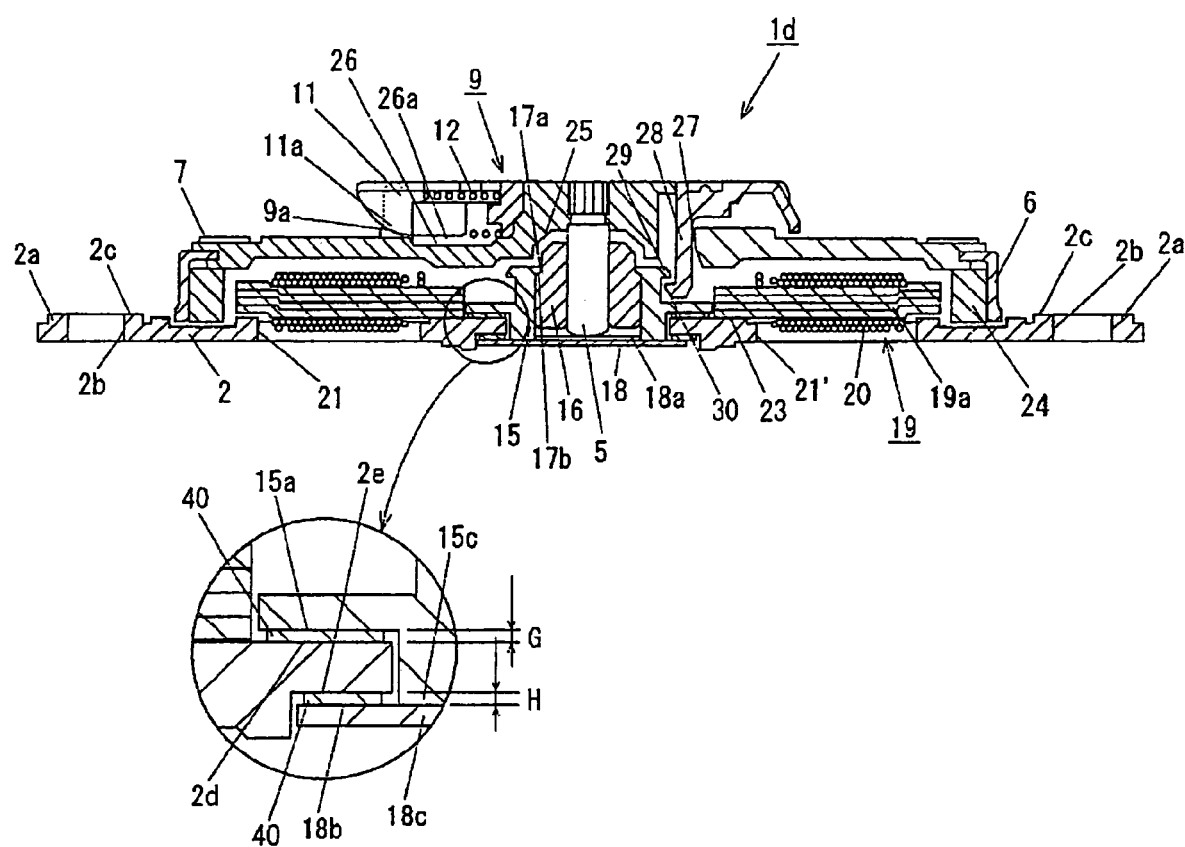
FIG. 13 is a sectional view of a main part of a disk drive according to Embodiment 5.

FIG. 13 is a sectional view which shows a main part of a disk drive according to Embodiment 5.

As shown in FIG. 13, reference numeral 1d denotes a disk drive according to Embodiment 5, 4 a turntable, 7 a slip preventive material, 9 a disk holding portion, 11 a disk holding claw and 12 a spring portion, and like reference numerals are imparted to constituent components including these which are like to those described with reference to Embodiment 1, and the description thereof will be omitted.

A gap portion G is maintained between an inner circumferential upper surface 2d of a base portion 2 and a lower surface 15a of a bearing holding portion 15, and an adhesive 40 is filled in the gap portion G.

In addition, a gap portion H is maintained between an inner circumferential lower surface 2e of the base portion 2 and an outer circumferential upper surface 18b of a thrust plate in such a state that a lower end surface 15c of the bearing holding portion 15 is in abutment with a inner circumferential upper surface 18c of the thrust plate, and the adhesive 40 is filled in the gap portion H.

Namely, as is obvious from FIG. 13, the thrust plate 18, which supports a distal end portion of a spindle 5 which lies to a side of the base portion 2, is provided in such a manner as to oppositely face a bearing portion 16, at least one mounting hole 2b, via which the disk drive is mounted on a housing, is provided on the base portion 2, the gap portions G, H, which intersect an axial direction of the spindle 5 at right angles, are provided respectively between the bearing holding portion 15 and the base portion 2 and between the thrust plate 18 and the base portion 2, and the adhesive 40 is filled in the gaps G, H, respectively.

The function of Embodiment 5 that is configured as has been described above will be described using FIGS. 14(a) to 14(b).

Figure 14:
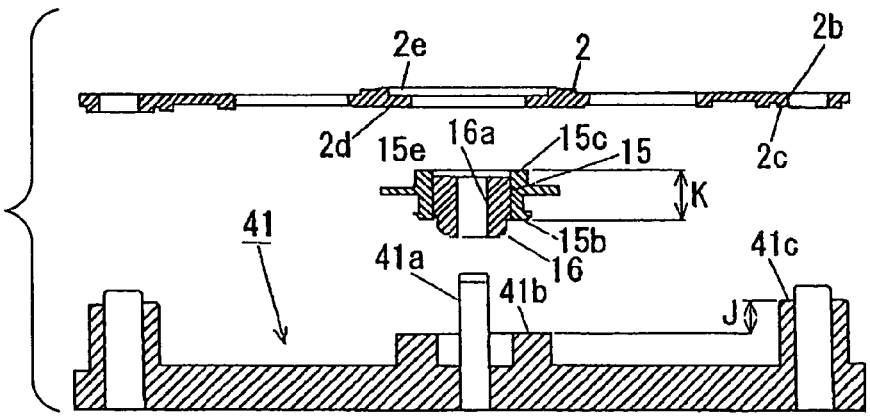
FIG. 14(a) is a sectional view of the main part of the disk drive of Embodiment 5 before the start of the assembling, (b) is a sectional view of the main part of the disk drive of Embodiment 5 in the middle of the assembling, and (c) is a sectional view of the main part of the disk drive of Embodiment 5 after the completion of the assembling.
Figure 14:
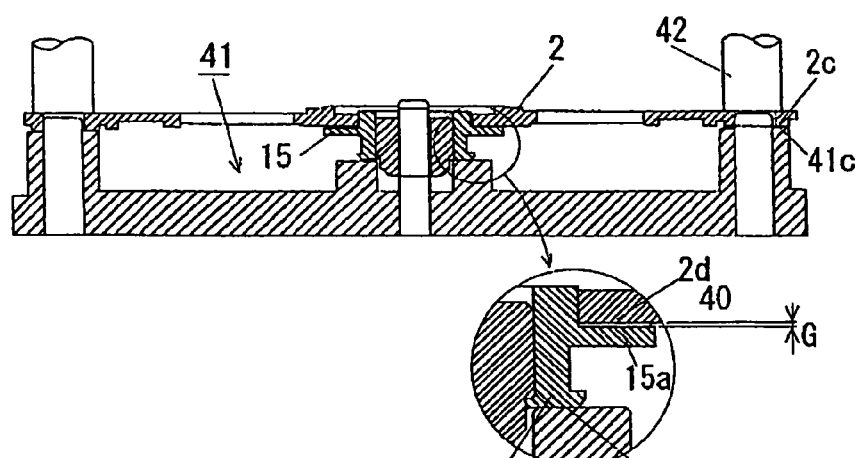
Figure 14:
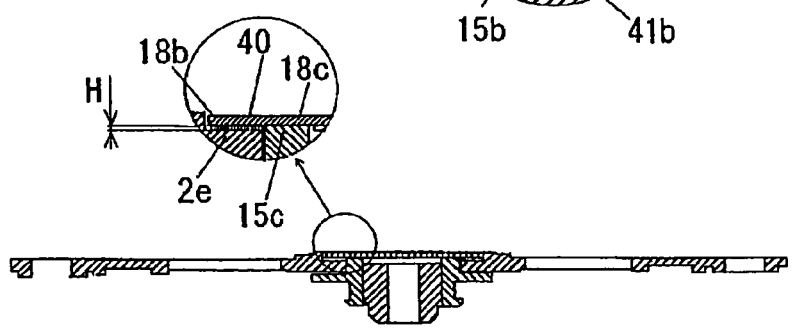
Figure 15:
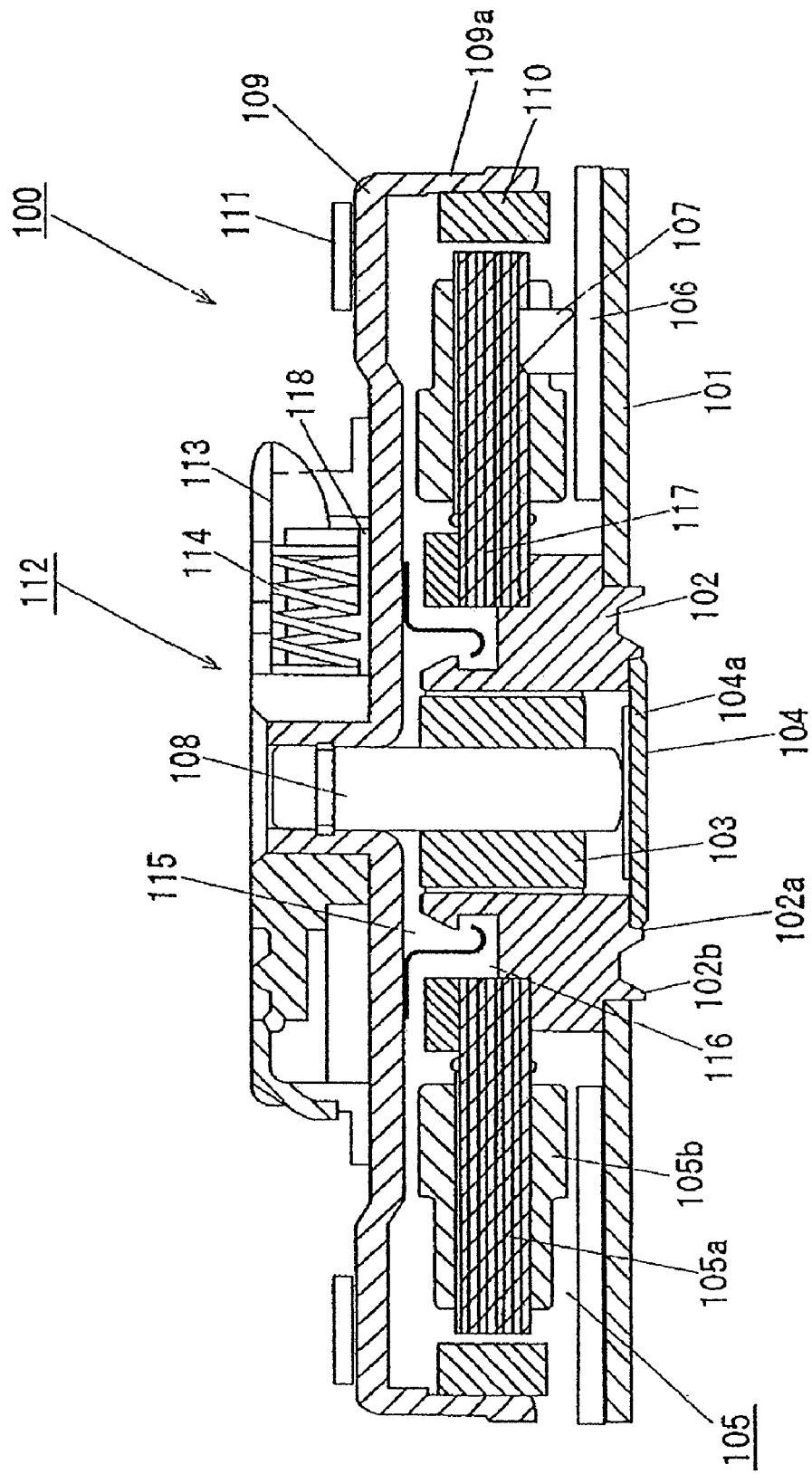
FIG. 15 is a sectional view of a main part of a conventional disk drive.
Figure 16:
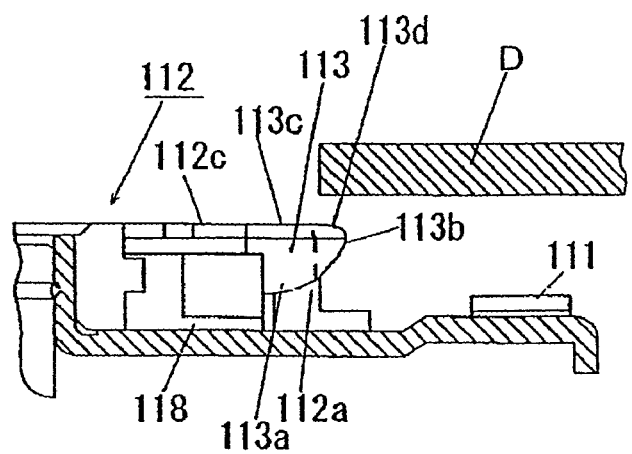
FIG. 16(a) is a sectional view of a main part of the conventional disk drive before the installation of a disk, (b) is a sectional view of the main part of the conventional disk drive at an initial stage of the installation of the disk, (c) is a sectional view of the main part of the conventional disk drive at a middle stage of the installation of the disk, and (d) is a sectional view of the main part of the conventional disk drive after the installation of the disk.
Figure 16:
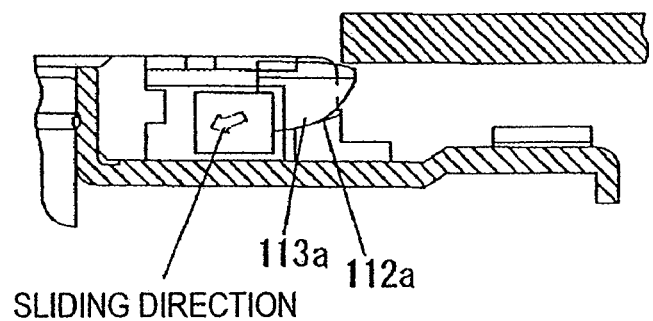
Figure 16:
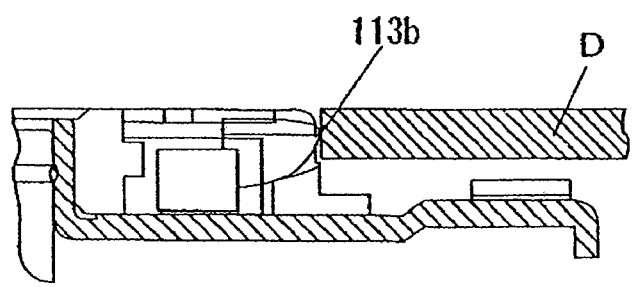
Figure 16:
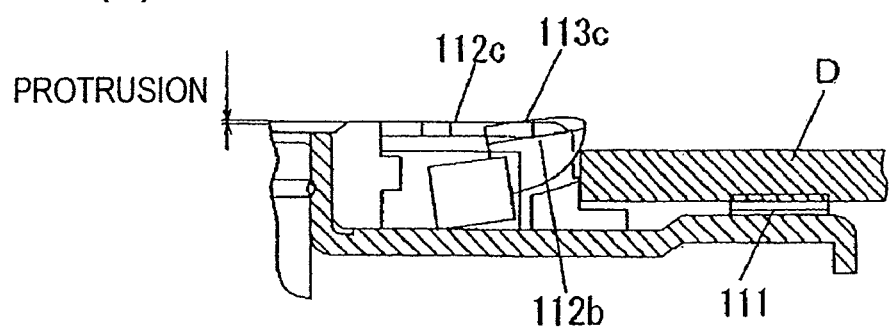

FIGS. 14(a) to 14(c) are sectional views of a main part of the disk drive 1d of Embodiment 5 which show a process of assembling the bearing holding portion 15, the base portion 2 and the thrust plate 18 as part of an assembling process of the disk drive 1d, in which FIG. 14(a) is a sectional view of the main part of the disk drive of Embodiment 5 before the start of the assembling, FIG. 14(b) is a sectional view of the main part of the disk drive of Embodiment 5 in the middle of the assembling and FIG. 14(c) is a sectional view of the main part of the disk drive of Embodiment 5 after the completion of the assembling.

Firstly, as shown in FIG. 14(a), the bearing portion 16 is press fitted in the bearing holding portion 15 in advance based on a radially inside portion 16a thereof.

Here, reference numeral 41 denotes a base jig which is used to carry out assembling, and the base jig 41 includes a center shaft 41a which is provided at a center portion thereof and which has an outside diameter which is slightly smaller than the radially inside portion 16a of the bearing portion 16, a holding portion abutment surface 41b which is provided on an upper surface side of an inner circumferential portion thereof so that an upper end face 15b of the bearing holding portion 15 is brought into abutment therewith, and furthermore, a mounting surface abutment surface 41c which is provided on an outer circumferential portion thereof at a position which corresponds to the mounting hole 2b of the base portion 2 so that the mounting surface 2c is brought into abutment therewith.

Next, as shown in FIG. 14(b), the mounting surface 2c of the base portion 2 and the mounting surface abutment surface 41c of the jig base 41 are in such a state that the relevant surfaces are suitably pressurized by a pressing jig pin 42 so that the respective surfaces are bonded together, and warping and falling components of the base portion 2 are corrected, whereby an equivalent state is produced to a state in which they are mounted on mounting surfaces (not shown) of a housing which is designed to house the disk drive 1d in which the relevant members are incorporated.

In this state, by filling the gap portion G with the adhesive 40, which is then allowed to set therein, the perpendicularity accuracy with a vertical center axis of the radially inside portion 16a of the bearing portion 16 based on the mounting surface 2c can be increased.

In addition, since a height-ways position of the lower end face 15c of the bearing holding portion 15 which constitutes a base for a height-ways assembling of the disk drive 1d is determined only by a jig distance dimension J between the holding portion abutment surface 41b and the mounting surface abutment surface 41c of the base jig 41 and a holding portion distance dimension K between the upper side end face 15b and the lower end face 15c of the bearing holding portion 15, the height-ways accuracy can also be increased.

Note that there will be no problem even when the adhesive 40 is applied in advance to the lower surface 15a of the bearing holding portion 15, and while anaerobic adhesives are used in many cases as the adhesive 40, the invention is not limited thereto.

In addition, the gap portion G is appropriately set in consideration of the warp and fall components of the base portion 2.

Furthermore, as shown in FIG. 14(c), the inner circumferential upper surface 18c of the thrust plate and the lower end face 15c of the bearing holding portion 15 are in such a state that they are in abutment with each other, the gap portion H is maintained between the outer circumferential upper surface 18b of the thrust plate and the inner circumferential lower surface 2c of the base portion 2, and the adhesive 40 is filled in the gap portion H, and since the effect by the film thickness of the adhesive layer can be eliminated due to the abutment portion and the adhesive portion being different, the assembling accuracy of the thrust plate 18 to the lower end face 15c of the bearing portion 15 can be increased which constitutes the base for the height-ways assembling of the disk drive 1d.

In the disk drive 1d according to Embodiment 5 which is configured as has been described above, since the perpendicularity accuracy with the vertical center axis of the radially inside portion 16a of the bearing portion 16 is increased and the height-ways accuracy is also increased, there can be provided the function that the thinning of the disk drive can be realized.

The invention relates to the disk drive which drives to rotate a disk such as a CD and a DVD which are used as recording media, and in particular, according to the invention, there can be provided the disk drive which can ease the installation work of the turntable and ensure the prevention of dislodgement of the turntable without deteriorating the flexibility of the dislodgement preventive portion and which can reduce the thickness and weight thereof by reducing the unnecessary spaces underside the turntable or the like, even in the event that the entirety of the disk drive is thinned.

The invention relates to the disk drive which drives to rotate a disk such as a CD and a DVD which are used as recording media, and in particular, according to the invention, there can be provided the disk drive which can reduce the thickness and weight of the base portion to thereby reduce the thickness and weight of the entirety of the disk drive while maintaining the strength of the base portion and the stability of the magnetic circuit at the outer circumferential portion of the stator core and which can furthermore increase the working efficiency in soldering wirings, as well as the accuracy and workability required when the disk drive is installed in the housing designed to house it.

What is claimed is:

1. A disk drive, comprising:
    a base portion;
    a cylindrical bearing holding portion, provided substantially at a central portion of the base portion;
    a bearing portion, held in an inside of the bearing holding portion;
    a stator, provided in such a manner as to surround circumferentially the bearing portion;
    a spindle, rotatably supported on the bearing portion, a turntable fixed to the spindle;
    an annular yoke, provided on an outer circumferential portion of the turntable;
    an annular magnet, provided on an inner side of the yoke in such a manner as to oppositely face the stator;
    a disk holding portion, provided at a central portion on an opposite surface of the turntable to the base portion, the disk drive comprising one or a plurality of through holes formed in the turntable in such a manner as to surround circumferentially the spindle;
    one or a plurality of dislodgement preventive portions, provided to extend from the disk holding portion towards the base portion through the respective through holes; and
    a hook locking portion, formed on an outer circumferential wall of the bearing holding portion and hook portions formed on distal end portions of the dislodgement preventive portions which lie to a side of the base portion,
    wherein the disk holding portion comprises:
    a plurality of sliding groove portions formed thereon in such a manner as to extend from an outer circumferential portion to a central portion thereof;
    disk holding claws, provided in such a manner as to freely move, respectively, into and out of the sliding groove portions; and
    spring portions, provided, respectively, in the sliding groove portions so as to bias the disk holding claws in such a manner as to protrude from an outer circumferential portion of the disk holding portion,
    wherein oscillation relief grooves are formed, respectively, at positions which substantially oppositely face the disk holding claws on the surface of the turntable which is opposite to the surface thereof which oppositely faces the base portion, wherein tilting restricting raised portions are provided, respectively, on radially inward surfaces of the disk holding claws which oppositely face the side of the turntable, and wherein accommodating recessed portions are formed, respectively, in the oscillation relief grooves on the turntable in such a manner as to accommodate therein the tilting restricting raised portions in such a state that the disk holding claws are slid inwards to a maximum extent when a disk is installed.

2. A disk drive, comprising:
    a turntable fixed to a spindle; and
    a disk holding portion provided on said turntable, comprising:

a plurality of sliding groove portions formed thereon in such a manner as to extend from an outer circumferential portion to a central portion thereof; and disk holding claws, provided in such a manner as to freely move, respectively, into and out of said plurality of sliding groove portions, wherein oscillation relieve grooves are formed, respectively, at positions which substantially oppositely face said disk holding claws on a surface of said turntable, wherein tilting restricting raised portions are provided, respectively, on radially inward surfaces of the disk holding claws which oppositely face a side of the turntable, and wherein accommodating recessed portions are formed, respectively, in the oscillation relief grooves to accommodate therein the tilting restricting raised portions when a disk is installed.

* * * * *